US008296456B2

(12) United States Patent
Klappert

(10) Patent No.: US 8,296,456 B2
(45) Date of Patent: Oct. 23, 2012

(54) SYSTEMS AND METHODS FOR DISPLAYING PERSONALIZED MEDIA CONTENT

(75) Inventor: Walter R. Klappert, Los Angeles, CA (US)

(73) Assignee: United Video Properties, Inc., Santa Clara, CA (US)

( * ) Notice: Subject to any disclaimer, the term of this patent is extended or adjusted under 35 U.S.C. 154(b) by 138 days.

(21) Appl. No.: 12/875,401

(22) Filed: Sep. 3, 2010

(65) Prior Publication Data

US 2012/0059953 A1    Mar. 8, 2012

(51) Int. Cl.
G06F 15/16    (2006.01)

(52) U.S. Cl. ........ 709/236; 709/217; 709/219; 386/278; 386/241; 386/250; 725/32; 725/138; 725/144; 725/36; 715/722; 715/718; 715/721; 348/143

(58) Field of Classification Search .................. 709/236, 709/217, 219
See application file for complete search history.

(56) References Cited

U.S. PATENT DOCUMENTS

| | | | |
|---|---|---|---|
| 5,830,065 A | 11/1998 | Sitrick | |
| 7,734,070 B1 | 6/2010 | Sharma et al. | |
| 2004/0218100 A1 | 11/2004 | Staker et al. | |
| 2005/0151743 A1 | 7/2005 | Sitrick | |
| 2006/0174264 A1 | 8/2006 | Candelore | |
| 2007/0008322 A1 | 1/2007 | Ludwigsen | |
| 2007/0291105 A1* | 12/2007 | Cataldo | 348/14.01 |
| 2008/0033801 A1 | 2/2008 | McKenna et al. | |
| 2009/0119369 A1 | 5/2009 | Chou | |
| 2010/0325657 A1* | 12/2010 | Sellers et al. | 725/32 |

FOREIGN PATENT DOCUMENTS

WO    WO2007/035558    3/2008
WO    WO2008/111746    9/2008

OTHER PUBLICATIONS

"I Have Something Great to Reveal", retrieved from http://en.tackfilm.se/, accessed prior to Mar. 4, 2010.
Picture from http://ariya.blogspot.com/2007_10_01_archive.html, accessed prior to Mar. 4, 2010.
Walpole et al., A Player for Adaptive MPEG Video Streaming Over the Internet, Proc. of SPIE 3240:270-281 (1998).
International Search report dated Apr. 23, 2012 for PCT/US2011/048787.

* cited by examiner

Primary Examiner — Jude Jean Gilles
(74) Attorney, Agent, or Firm — Ropes & Gray LLP

(57) ABSTRACT

Systems and methods for generating and/or displaying personalized video content are provided. In some embodiments, a video asset made up of a set of frames, including a preliminary frame with an object region, is received at user equipment. A media element is identified and transmitted to a remote server, where it is processed to produce a modified version of the media element and then transmitted back to the user equipment. The video asset is displayed at the user equipment, except that a modified frame incorporating the modified version of the media element is displayed in place of the preliminary frame. The modified version of the media element is incorporated in an area of the modified frame corresponding to the object region of the preliminary frame.

20 Claims, 20 Drawing Sheets

SYSTEMS AND METHODS FOR DISPLAYING PERSONALIZED MEDIA CONTENT

BACKGROUND OF THE INVENTION

Modern day media consumption is increasingly characterized by content tailored to the individual. Traditional advertisement systems, for example, may provide mechanisms for dynamically modifying a multimedia program to incorporate advertised products based on user interests. McKenna et al. U.S. Patent Application Publication No. 2008/0033801, for example, refers to a multi-media object management system that integrates an object representing an advertiser's product into a video program, as the program is delivered to an individual recipient. However, such systems fail to provide a dynamic, flexible, and/or fully automated system for personalizing multimedia content. In particular, traditional systems are limited to a finite set of pre-selected objects (e.g., by an advertiser), and do not provide robust personalization options to facilitate the integration of user-centric media content (e.g., an image of the user) into multimedia content.

In addition, traditional Internet services may allow a user to submit a photograph for integration into a web video, which may then be shared with other users. However, these Internet services are based on centralized processing, whereby video customization occurs only at a remote location and at the direction of a remote server, and therefore lack the ability to distribute and/or share media processing tasks with user equipment. Such resource sharing may be essential to providing personalization options on a mass scale, e.g., to a large population of users and/or for an ever-growing collection of video content.

SUMMARY OF THE INVENTION

Accordingly, systems and methods for generating and/or displaying personalized video content are provided in accordance with various embodiments of the present invention.

In some embodiments, a video asset made up of a set of frames, including a preliminary frame with an object region, is received at user equipment. A media element suitable for display within the object region may be identified and transmitted to a remote server. The remote server, in turn, may process the media element to produce a modified version of the media element, which is then transmitted back to the user equipment. The video asset may be displayed at the user equipment, except that a modified frame incorporating the modified version of the media element is displayed in place of the preliminary frame. The modified version of the media element is incorporated in an area of the modified frame corresponding to the object region of the preliminary frame.

In one approach, the user equipment embeds the modified version of the media element within the object region of the preliminary frame to produce the modified frame. In another approach, the remote server embeds the modified version of the media element within the object region of the preliminary frame to produce the modified frame. The user equipment receives the modified frame from the remote server and, with it, the modified version of the media element. In this latter approach, the user equipment may provide the preliminary frame to the remote server. Alternatively, the remote server may retrieve the preliminary frame itself, e.g., from a data store or the head-end.

In some embodiments, when the video asset is received at the user equipment, the video asset—including the preliminary frame—is stored within a storage device. Once the modified frame is produced, the modified frame may be stored in place of the preliminary frame within the storage device. Then, when the video asset is displayed, the video asset—including the modified frame—may be retrieved from the storage device.

In other embodiments, the video asset and the modified frame are stored within a first buffer and second buffer, respectively. Then, when the video asset is displayed, data from the first buffer is retrieved to display each of the frames other than the preliminary frame. Data from the second buffer is retrieved to display the modified frame in place of the preliminary frame.

In yet other embodiments, the video asset—including the preliminary frame—is stored within a first buffer and the modified version of the media element is stored within a second buffer. Then, when the video asset is displayed, data associated with the preliminary frame is retrieved from the first buffer to display all portions of the preliminary frame other than the object region. Data associated with the modified version of the media element is retrieved from the second buffer to display the modified version of the media element in place of the object region of the preliminary frame.

In some embodiments, available processing resources within the user equipment are identified. The media element is only transmitted to the remote server when it is determined that the processing resources are insufficient for generating the modified version of the media element. Moreover, in some embodiments, the media element is identified based on personalization parameters associated with the object region. The personalization parameters may include a display property, a content characteristic, and/or a unique identifier. Alternatively, or additionally, a user indicates the media element to incorporate within the object region. The user equipment may identify the media element in response to receiving the user indication.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE VARIOUS EMBODIMENTS

Figure 1:
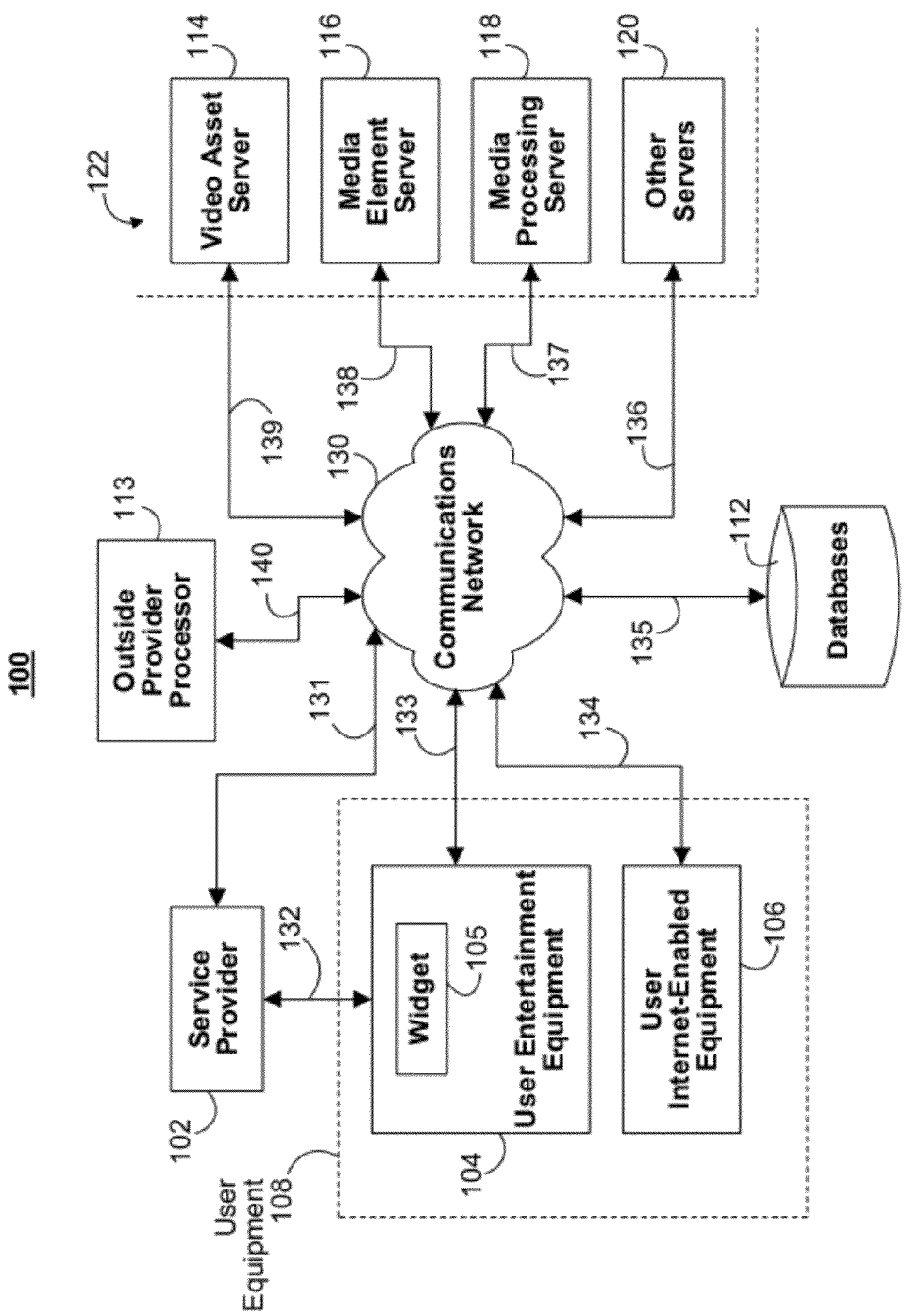
FIG. 1 illustrates an example of a system for personalizing media content using a widget in accordance with some embodiments of the present invention.

Widgets are applications (i.e., collections of instructions executable by a processor) that provide information from the Internet and/or otherwise remotely accessible servers (hereinafter "remote servers") to a user. A widget may provide this information through web services and/or using any suitable communication protocol (e.g., TCP/IP, IPTV, etc.). Widgets may also perform local processing tasks, such as modifying media elements and video frames, and may also control display features of user equipment, such as hardware and software tasks involved in displaying a video frame. These widget capabilities, as well as additional widget functionality, will be described in greater detail below.

A widget may run on a television, user equipment associated with a television, and/or other user equipment capable of providing media to a user (e.g., a mobile phone, e-reader, camera, or video player). Television widgets are widgets that run strictly on the hardware platform (e.g., control circuitry) of a television. Typically, television widgets have limited interactions with external user equipment and databases, such as set-top boxes and third party servers. It will be understood that where the below description refers to a widget or widgets, the term is inclusive of television widgets and other applications with widget-type functionality. For example, a widget may be or include a JAVA applet executable on a mobile device. JAVA is a registered trademark owned by Sun Microsystems, Inc. More generally, a widget may be, include, or be part of an application, a software module, or other suitable set of computer-readable instructions. A widget may also be referred to, in some instances, as an "app."

In accordance with some embodiments of the present invention, a widget may be used to display a video frame (or set of video frames) that incorporates a media element within an object region. A video frame is a still image or graphic, and may be one of a number of video frames that, when taken together, compose a video asset. For example, in traditional television systems, video is presented to a user as a sequence of video frames displayed at a rate of 24 to 30 frames per second. Hereinafter, the term "frame" may be used interchangeably with "video frame" and should be construed to have the same meaning. An object region is an area of a frame designated for the display of a media element. For example, a media element may be embedded within an object region to produce a modified frame.

In some embodiments, an object region may be designated via a chroma key. A chroma key is a portion of a frame with a pre-selected color (e.g., blue or green) that may be removed, made transparent, overlaid, or otherwise obscured or filtered in order to reveal other media content (e.g., a media element). In other embodiments, an object region may be designated via a set of coordinates defining the area of a frame corresponding to the object region. It should be understood that any suitable data and/or media artifact may be used to designate and/or define the area of an object region. Like a chroma key, this area may be removed, made transparent, overlaid, or otherwise obscured or filtered in order to reveal other media content (e.g., a media element).

As used herein, a media element refers to an image, video, text, audio, or a combination thereof (e.g., a multimedia element). An image may be any type of visual content including a graphic, a picture, a snapshot of video, an illustration, a drawing, a chart, etc. Video may be any type of video content including a television program, video-on-demand (VOD) program, video clip, movie, trailer, animation, etc. Text may be any sequence of characters including messages (e.g., email or SMS), titles, indicators, identifiers, hyperlinks, names, addresses, phone numbers, etc. Audio may be any type of audio content including songs, dialogue, narration, background music, sound effects, synthesized speech, etc.

FIG. 1 illustrates an example of a system 100 for personalizing media content using a widget 105 in accordance with some embodiments of the present invention. Widget 105 may be resident in user entertainment equipment 104 within user equipment 108. Alternatively, widget 105 may be resident in user internet-enabled equipment 106 within user equipment 108. User equipment 108 may include both user entertainment equipment 104 and user internet-enabled equipment 106.

Widget 105 may be a software application that is downloaded or installed, for instance, in user entertainment equipment 104. Widget 105 may be executed by an interpreter or virtual machine running, for example, on control circuitry of user entertainment equipment 104 (e.g., control circuitry 204 of FIG. 2). Widget 105 may allow users to interact with web services while watching television or other video program on user entertainment equipment 104. In some embodiments, widget 105 may run on the Yahoo! Connected TV platform, and user entertainment equipment 104 may be a television manufactured with built-in support for widget 105 (e.g., from one of Samsung Group, Sony Group, LG Electronics, or Vizio).

Figure 2:
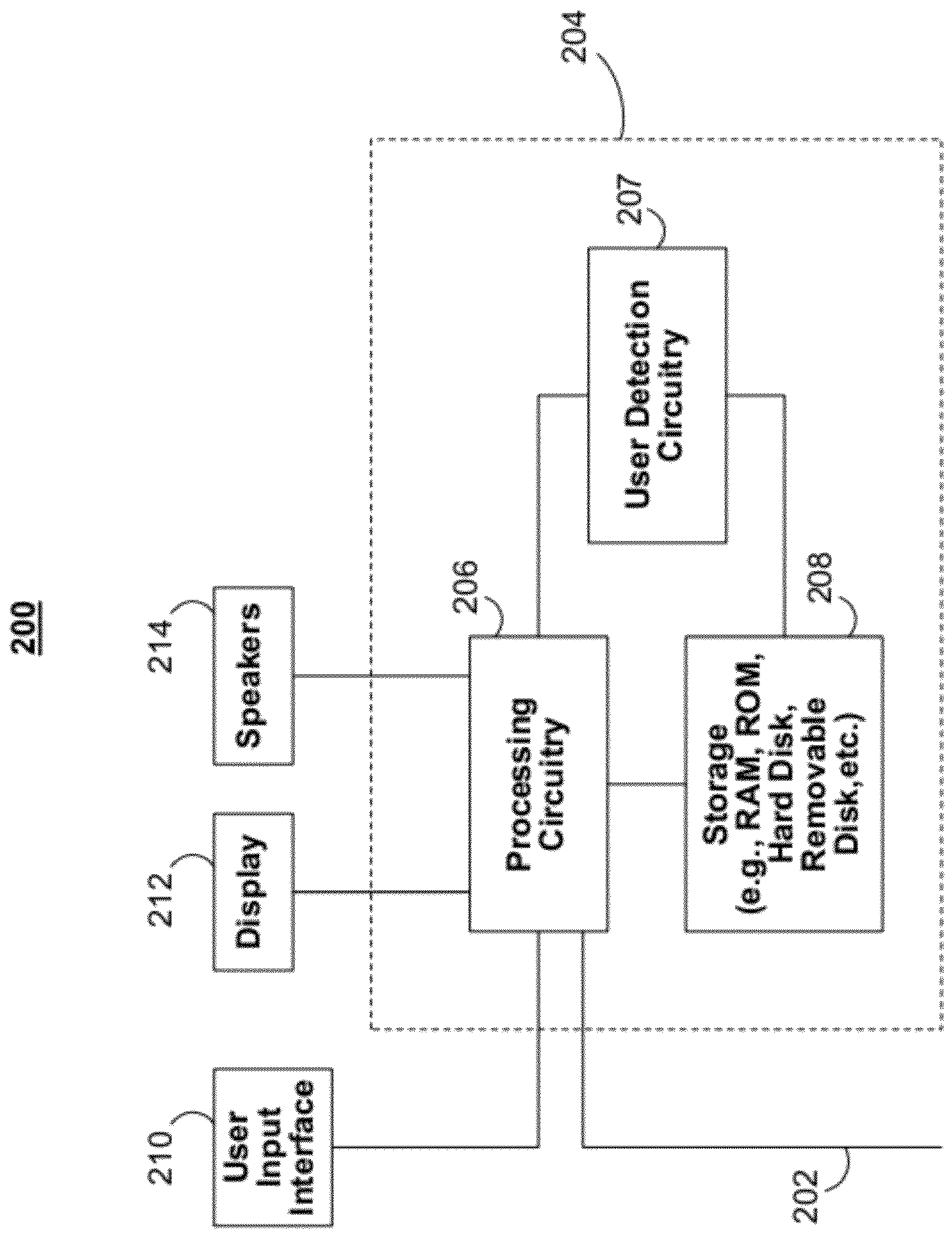
FIG. 2 illustrates an example of a user equipment device that may be used to implement the widget in accordance with some embodiments of the present invention.

In some embodiments, widget 105 may be one of several widgets that make up an application packaged and/or encoded in the ETV Binary Interchange Format (EBIF), received by control circuitry 204 of FIG. 2 as part of a suitable feed, and interpreted by a user agent running on control circuitry 204. For example, widget 105 may be part of an EBIF application and user entertainment equipment 104 may be a set-top box. In other embodiments, the widget may be defined by one or more JAVA-based files that are received and run by a local virtual machine or other suitable middleware executed by control circuitry 204 of FIG. 2. In yet other embodiments (e.g., those employing MPEG-2 or other digital media encoding schemes), the widget may be encoded and transmitted in an MPEG-2 object carousel with the MPEG audio and video packets of a program. In this embodiment, widget 105 may be part of an OpenCable Application Platform (OCAP) application (e.g., a tru2way application), and user entertainment equipment 104 may be a set-top box.

In other embodiments, user entertainment equipment 104 may include user television equipment, user computer equipment, a wireless user communication device, an e-reader, a set-top box, or any other type of user entertainment equipment for accessing media, such as a non-portable or portable gaming machine.

In some embodiments, the user may enter settings information, such as user profile information, user login information, and user permissions information, into user internet-enabled equipment 106. Assuming that the user sets their permissions such that user profile information may be stored externally, the user profile information may be stored in a remote data store (e.g., one of databases 112). Otherwise, the user profile information may be stored in a data store within user equipment 108 (e.g., storage 208 of FIG. 2). User internet-enabled equipment 106 may include a set-top box, an integrated receiver decoder (IRD) for handling satellite television, a PC, a laptop, a tablet, an e-reader, a WebTV box, a personal computer television (PC/TV), a PC media server, a PC media center, a television set, a digital storage device, a DVD recorder, a video-cassette recorder (VCR), a local media server, wireless user communications devices, or any other suitable internet-enabled equipment. WEBTV is a trademark owned by Microsoft Corp. Wireless communications devices may include PDAs, a mobile telephone, a smartphone, a portable music player, a portable gaming machine, or other wireless devices.

In system 100, there is typically more than one of each type of user equipment device but only one of each is shown in FIG. 1 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

It should be noted that with the advent of television tuner cards for PC's, WebTV, and the integration of video into other user equipment devices, the lines have become blurred when trying to classify a device as a user entertainment device or a user internet-enabled device. In fact, in some embodiments widget 105 may run on user internet-enabled equipment 106 in addition to user entertainment equipment 104, and settings information may be entered using either type of user equipment. Each of user equipment 108 may utilize at least some of the system features described below with respect to FIG. 2 and, as a result, include flexibility with respect to the type of interactive applications available on the device. For example, user entertainment equipment 104 may be internet-enabled allowing for access to settings information through the Internet, while user internet-enabled equipment 106 may include a tuner allowing for access to television programming, and both may run widget 105. It should therefore be understood that, in some embodiments, user entertainment equipment 104 and user internet-enabled equipment 106 are integrated components of a single user device (i.e., user equipment 108).

Widget 105 may have the same display layout and/or execution parameters on the various types of user equipment or may be tailored to the display and/or processing capabilities of the user equipment. For example, on user entertainment equipment 104, widget 105 may run as a persistent (e.g., always-running) application. In another example, the widget display screens may be scaled down for wireless user communications devices.

In addition to widget 105, user equipment 108 may access and/or run a media guidance application that provides an interface that allows users to efficiently navigate through media selections and easily identify media content that they may desire. Media guidance applications may take various forms depending on the media for which they provide guidance. One typical type of media guidance application is an interactive television program guide. Interactive television program guides (sometimes referred to as electronic program guides or EPGs) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), recorded programs, and other types of media content (e.g., audio content). Moreover, media guidance applications allow users to navigate among and locate content related to the media content for which guidance is provided including, for example, video clips, audio assets, articles, advertisements, chat sessions, games, etc. Media guidance applications may be provided as on-line applications (i.e., provided on a web-site), or as stand-alone applications or clients.

The aforementioned settings information entered by the user may be consistent across in-home devices and remote devices. Settings include those user profile, user login, and user permission settings described herein, as well as media favorites, media guidance settings, display preferences, and other desirable settings. For example, if a user sets a channel as a favorite on, for example, the web site www.tvguide.com on their personal computer at their office, the same channel would appear as a favorite on the user's in-home devices (e.g., in a media guidance application running on user entertainment equipment 104). Therefore, changes in settings made on one user equipment device can change the user's experience on another user equipment device, regardless of whether they are the same or a different type of user equipment device. In addition, the changes made may be based on settings input by a user, as well as monitored user activity (e.g., activity monitored by widget 105).

In some embodiments, user profile information may include data from monitoring a user's activity. For example, user interaction with widget 105, a media guidance application, and/or any other suitable application or feature (e.g., running on or displayed by user equipment 108) may be monitored and recorded. User profile information may also include user-identifying information (e.g., the user's name), user viewing habits, user demographic information, or any other suitable data relating to and/or describing a user. User profile information may be stored within user equipment 108 and/or at a remote location (e.g., databases 112).

The user equipment devices of user equipment 108 may be coupled to communications network 130. Namely, user entertainment equipment 104 and user internet-enabled equipment 106 may be coupled to communications network 130 using communications paths 133 and 134, respectively. Communications network 130 may be one or more networks including a local area network, a wide area network, the Internet, a mobile phone network, mobile device (e.g., Blackberry) network, cable network, public switched telephone network, or other types of communications networks. BLACKBERRY is a service mark owned by Research In Motion Limited, Corp. Paths 131-140 may separately or together include one or more communications paths, such as, a satellite path, a fiber-optic path, a cable path, a path that supports Internet communications (e.g., TCP/IP, IPTV, etc.), free-space connections (e.g., for broadcast or other wireless signals), or any other suitable wired or wireless communications path or combination of such paths. Communications with the user equipment devices may be provided by one or more of these communications paths, but are shown as single paths in FIG. 1 to avoid overcomplicating the drawing.

Although communications paths are not drawn between user equipment devices, these devices may communicate directly with each other through communications network 130 and/or via short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other indirectly, e.g., through an indirect path via communications network 130.

When a video asset is displayed, selected for display, or otherwise timed for display on user entertainment equipment 104, widget 105 may be invoked to personalize the video asset. Similarly, when a video asset is stored, selected for storage, or otherwise timed for storage on a local or remote storage device, widget 105 may be invoked to personalize the video asset. It should be understood that, although the description herein may refer to techniques and features for personalizing a video asset before or as it is displayed, those same techniques and features may be employed to personalize a video asset before or as it is stored. For example, references to displaying a modified frame of the video asset apply equally, in some cases, to storing the modified frame in a storage device.

In some embodiments, widget 105 is invoked expressly by the user, for instance, in response to an indication or selection received from the user (e.g., via user input interface 210 of FIG. 2). In other embodiments, widget 105 is invoked automatically, for example, upon selection or display of the video asset. In either embodiment, widget 105 may only be available for invocation when a personalization option is available for the video asset. For example, before displaying a video asset, control circuitry in user equipment (e.g., processing circuitry 208 of FIG. 2 or an application running thereon) may determine if a personalization option is available for the video asset; if so, widget 105 may be invoked. In one approach, a personalization option may be indicated in metadata (e.g., metadata included within or along with the video asset) or a data record associated with the video asset (e.g., in a data file or database record identifying the video asset). In another approach, a personalization option may be indicated by virtue of an object region (e.g., as defined by a chroma key or coordinate set) being present in at least one frame of the video asset. In this approach, for example, the frames of the video asset may be analyzed to detect the presence of an object region. In yet another approach, a personalization option may be indicated in a data packet or media indicator (e.g., a television program listing) provided by a head-end (e.g., the source that transmitted the video asset). In still yet another approach, a personalization option may be indicated by virtue of a media element or modified frame being present in and/or associated with the video asset.

In response to invocation, widget 105 may send information to service provider 102 over communications link 132 and/or to outside provider processor 113 (hereinafter "OPP 113") over communications network 130 (including, e.g., paths 133 and 140). In some embodiments, communications with service provider 102 and OPP 113 may be exchanged over one or more communications paths, but are shown as two separate paths in FIG. 1 to avoid overcomplicating the drawing. In addition, there may be more than one of each of service provider 102 and OPP 113, but only one of each is shown in FIG. 1 to avoid overcomplicating the drawing. As will be described, the information that widget 105 sends to these sources may be as little as an identification number, an indication of the channel or video asset the user is watching, and/or an indication of a media element selected by the user.

Service provider 102 may include one or more types of media distribution equipment including a television distribution facility, cable system head-end, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Service provider 102 may be the originator of media content, e.g., a television or internet broadcaster, a Webcast or streaming video provider, a digital cable service provider, a bundled communication (e.g., Internet, telephone, and TV) provider such as Verizon FiOS, a provider of digital on-demand media, a cellular telephone service provider, etc. Alternatively, service provider 102 may not be the originator of media content, e.g., an on-demand media content provider, an Internet provider of video content of broadcast programs for downloading or streaming, etc. Service provider 102 may include cable sources, satellite providers, on-demand providers, Internet providers, or other providers of media content. Service provider 102 may also include a remote media server used to store different types of media content (including video content selected by a user, for example, on a website), in a location remote from any of the user equipment devices. As used herein, the term broadcaster may refer to an analog or digital signal provider, a cable network, a satellite provider, an Internet website, an Internet content provider, or any such provider that may distribute media content such as video assets to user equipment or user equipment devices. As used herein, the terms broadcaster's website or media broadcaster's website may refer to one or many web addresses, server addresses, databases, or other sources of media information or media content, specific to a particular broadcaster, and associated with Internet websites or other content providers. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Service provider 102 may broadcast or otherwise transmit a video asset to user equipment 108. The video asset may be transmitted at a scheduled time or in response to a request, e.g., as video-on-demand (VOD). In some embodiments, a web server (e.g., server 114) may provide the video asset to service provider 102. In one approach, the video asset may be delivered to user equipment 108 over-the-top (OTT) using broadband services, e.g., provided by service provider 102. A set-top box or other processing circuitry in user equipment 108 may decode the video asset and output the video asset in one or more formats. For example, a video asset may be received by a set-top box in a standard web format (e.g., MPEG, FLASH, H.264, Ogg, etc.) and converted into a standard television signal for display on a television screen. In this approach, even vintage television sets may display web-originated video.

Service provider 102 may also provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips or segments, etc.), on-demand information, and any other type of guidance data that is helpful for a user to navigate among and locate desired media selections.

OPP 113 may include a data processor (e.g., any suitable computer server equipment) operated by an outside provider (e.g., the provider of widget 105) that can act as a central hub for communications between widget 105 running on user equipment 108, service provider 102, and third party servers 122. As will be discussed, third party servers 122 may include video asset server 114, media element server 116, media processing server 118, and other servers 120. In some embodiments, OPP 113 may store and retrieve information from databases 112. Databases 112 may be any suitable computer server equipment and/or any suitable data storage device.

In some embodiments, OPP 113 may identify information associated with the invocation of widget 105 (e.g., OPP 113 may identify the video asset that caused widget 105 to be invoked, a frame of the video asset with an object region, etc.). To achieve this function, OPP 113 may exchange information with service provider 102, user equipment 108, and databases 112 via communication network 130. In an embodiment, as will be described below, OPP 113 may identify a media element based on user profile information (e.g., stored in databases 112). In some embodiments, this identification may be made by service provider 102 itself.

In some embodiments, OPP 113 may act as a clearinghouse of information for providing data and/or other interactive features to the user of widget 105. To achieve this function, OPP may exchange information with third party servers 122 via communications network 130 and/or communication links 136-140. For example, OPP 113 may receive a video asset from video asset server 114 and provide the video asset to user equipment 108 via communication network 130. Alternatively, user equipment 108 may receive the video asset directly from video asset server 114. As another example, OPP 113 may transmit a request for a video asset or a portion of a video asset (e.g., a specific frame of the video asset) to video asset server 114. Video asset server 114 may fulfill the request by providing the video asset or portion of the video asset to the OPP 113 via communications network 130. Alternatively, video asset server 114 may fulfill the request by providing the video asset or portion of the video asset to the OPP 113 from databases 112 via communications network 130.

In some embodiments, OPP 113 may communicate with media element server 116 (via communications network 130) to identify and/or receive a media element. For example, OPP 113 may transmit identifying information including user profile information (e.g., a name, email address, etc.) from databases 112 to media element server 116. Media element server 116 may then provide one or more media elements to OPP 113 associated with the user profile information. In turn, OPP 113 may provide one or more of these media elements to user equipment 108 for use by widget 105. It should be understood by way of the above examples that OPP 113 may communicate with any or all of third party servers 122, databases 112, and service provider 102 to provide information and/or media content to user equipment 108, e.g., at the behest of and for use by widget 105. In some embodiments, OPP 113 provides data and/or other interactive features in the form of visual information (e.g., text, images, and/or video) to user equipment 108, which are then displayed by widget 105. In other embodiments, this visual information may be provided to the user through particular features of user equipment 108 outside of the functionality of widget 105.

In an exemplary embodiment, a video asset may be transmitted from video asset server 114 to user equipment 108. The video asset may be transmitted to user equipment 108 through OPP 113 via communications network 130, or the video asset may be transmitted directly from video asset server 114 to user equipment 108 (e.g., through one or more commutations paths). The transmission of the video asset may be initiated by video asset server 114 at a predetermined time (e.g., according to a broadcast schedule), or prompted by a request from OPP 113 or service provider 102. Alternatively, the video asset may have been requested by a user (e.g., of user equipment 108) through an interactive feature or media guidance application. For example, the user may have indicated a desire to watch the video asset by selecting a media listing or a link on a web site. In some embodiments, the video asset is a television program (or other media broadcast) and may accordingly be displayed by tuning to the appropriate channel. In this embodiment, video asset server 114 may be a head-end that broadcasts the television program. In other embodiments, the video asset is a video program available for streaming or download via the Internet. In this embodiment, video asset server 114 may be an internet-connected server that transmits the video program to user equipment 104 upon request.

Once the video asset is received at user equipment 108, widget 105 may be invoked, as described above, upon determining that a personalization option is available for the video asset. Alternatively, widget 105 may be invoked upon video asset reception or before the video asset is displayed, and the widget itself may determine whether a personalization option is available for the video asset. When a personalization option is available, widget 105 may commence a routine to personalize the video asset.

As will be described below in further detail, widget 105 may review the video asset to determine which frames of the video asset have object regions (e.g., as indicated by a chroma key or coordinate set). These object regions (or, e.g., the frames that contain them) may be associated with personalization parameters. The personalization parameters may include a display property, a content characteristic, and/or a unique identifier, and may be used by widget 105 to identify media elements suitable for insertion into each of the object regions. For example, widget 105 may determine that the video asset has a number of frames with object regions each associated with the same personalization parameters. Accordingly, a single media element satisfying the personalization parameters may be identified by widget 105. Personalization parameters and their use by widget 105 to identify media elements will be described in greater detail below.

Widget 105 may search user equipment 108 for a media element suitable for insertion into one or more identified object regions of the video asset (e.g., a media element satisfying the relevant personalization parameters). In some embodiments, user information (e.g., user profile information) may be retrieved and used to locate media elements instead of, or along with, the personalization parameters. Alternatively, widget 105 may send a request to OPP 113 or media element server 116 for a suitable media element. The request for a suitable media element may include the relevant personalization parameters and/or user information (e.g., user profile information). For example, widget 105 (or OPP 113) may search a social networking web site for photographs associated with a user identified in the user information.

Once widget 105 identifies media elements for the video asset, the media elements may be modified according to the personalization parameters. Modification of media elements will be described below in greater detail. For example, a media element may be sized and oriented to appear natural in the context of the frame in which it is to be embedded. The processing that modifies the media element may be performed locally, e.g., by widget 105, or remotely, e.g., by media processing server 118. In some embodiments, widget 105 transmits the media element to OPP 113 for processing, and OPP 113 forwards the media element to media processing server 118. After being processed, the modified media element may then be returned to widget 105 on user equipment 108, e.g., directly (e.g., via communications network 130) or by way of OPP 113. Widget 105 may then store the modified media element and/or embed the modified media element within the object region of the frame. Alternatively, the modified media element may be embedded within the frame at media processing server 118 and the modified frame may be provided to user equipment 108.

Thus, in one approach, OPP 113 may act as the central conduit and processor for personalizing video content. Widget 105 may accordingly transmit all (or some) requests for media elements, media element processing, and/or frame modification through OPP 113, which may communicate with third party servers 122 to retrieve the necessary data. In another approach, widget 105 itself performs the media element identification, processing, and/or frame modification, and may interface directly with third party servers 122 to retrieve the necessary data. In a third approach, widget 105 and OPP 113 share the personalization tasks.

Video asset server 114 may include any suitable computer server equipment capable of broadcasting or delivering media content. Such video asset servers may include traditional head-ends, such as television broadcast stations, and may include internet servers configured to deliver content upon request (e.g., on-demand, streaming content, downloadable content). For example, a media asset server may be one belonging to Blockbuster Video, Hulu, Netflix, Apple iTunes, or Amazon.com. In some embodiments, video asset server 114 may send inventory and other information to OPP 113 via communications network 130. For example, video asset server 114 may send OPP 113 information regarding media content available via video-on-demand or digital download. The inventory information may be provided, for example, to a media guidance application on user equipment 108.

Media element server 116 may include any suitable computer server equipment capable of providing an image, video, text, or audio, or any combination thereof. Media element server 116 may communicate with databases 112 to retrieve user profile information and other relevant data for media element selection. Alternatively, user information may be provided to media element server 116 from OPP 113 or widget 105. Media element server 116 may be, for example, a repository of user images. These images may be associated with identifying information that may substantially match user information. Media element server 116 may also be an internet server such as that belonging to a social networking service (e.g., Facebook). A social networking service may provide profile pictures of users that may be retrieved using user information. Other images may also be accessible that match user information, or that are associated with user information (e.g., pictures of the user's friends). In some embodiments, media element server 116 is the same server as video asset server 114 and/or media processing server 118.

Media processing server 118 may include any suitable computer server equipment capable of processing media elements and/or video frames. Processing may include digital image processing, digital video processing, and/or any other sort of digital content manipulation. The processing features of media processing server 118 may be implemented in hardware, software, or both. Processing a media element may include extracting a portion of the media element (e.g., using facial recognition technology), altering the geometrical properties of the media element, adjusting the color properties of the media element, adjusting the resolution and/or quality of the media element, applying a filter (e.g., a blur filter) to the media element, adding shadow and/or highlight features to the media element, converting the media element from one format to another (e.g., from a JPEG to a Device Independent Bitmap), or a combination thereof. These processing features will be discussed in greater detail in connection with FIG. 19.

In processing the media element, further, media processing server 118 may receive instructions (e.g., from OPP 113 or directly from widget 105) on what processing features to apply to the media element. These instructions may be specified within the personalization parameters associated with each object region. For example, the personalization parameters may specify an orientation and/or size. As another example, the personalization parameters may specify content to be extracted from the media element, e.g., a particular body part.

Media processing server 118 may also retrieve processing instructions from databases 112, which may contain information on desired characteristics of a media element that is to be embedded in a particular object region. Moreover, media processing server 118 may automatically extract processing requirements from the characteristics of the object region. For example, size, shape, and/or orientation may be derived from the size, shape, and/or orientation of the object region, e.g., as defined by a chroma key or coordinate set. Media processing server 118 may also automatically extract processing requirements from the characteristics of the video frame containing the object region. For example, the edges of the media element may be blended with the background of the video frame, or the image features surrounding the object region. As another example, a set of colors (i.e., a color palette) used in the video frame may be derived, and the media element may be modified such that its color palette substantially matches the video frame color palette. As yet another example, a histogram defining luminance and/or chrominance of the video frame may be generated and the media element may be modified so that its corresponding histograms have some or all of the same statistical properties.

Media processing server 118 may embed media elements (processed or original) in the object region of a video frame. In some embodiments, the video frame may be provided by widget 105. For example, widget 105 may detect an object region in a particular video frame, identify a suitable media element for display therein (e.g., from media element server 116 or within user equipment 108), and transmit both the media element and the target frame to media processing server 118. In other embodiments, the video frame may be provided by, or provided based on instructions from, OPP 113. For example, widget 105 may detect an object region in a particular video frame and request a modified frame from OPP 113. In this example, OPP 113 may identify a suitable media element for display within the object region and ensure media processing server 118 receives the media element and target frame. OPP 113 may directly transmit the media element and target frame to media processing server 118, or OPP 113 may cause video asset server 114 and media element server 116 to transmit the target frame and the media element, respectively, to media processing server 118. In yet other embodiments, media processing server 118 may retrieve the target frame itself, e.g., from video asset server 114. For example, widget 105 or OPP 113 may transmit a media element and an indication of a target video frame (e.g., a link or identifier associated with the target video frame) to media processing server 118. In turn, media processing server 118 may use the indication to retrieve the target video frame from video asset server 114.

In some embodiments, media processing server 118 may embed the media element (or a modified version of the media element) into the object region of the frame to produce a modified frame. The embedding may be performed using any suitable algorithm or processing technique. For example, the media element may be overlaid over the video frame in the location of the object region. As another example, the media element may be placed on an image layer below that of the frame (e.g., in the location of the object region) and the area of the video frame corresponding to the object region may be removed or made transparent thereby revealing (all or a portion of) the media element underneath. In some embodiments the video frame embedding the media element is resampled or flattened, and any structural distinction between the video frame and the embedded media element may be lost. In other embodiments, the video frame and embedded media element retain structural independence (e.g., may be stored on different image layers). In this latter embodiment, the media element could be easily removed or hidden if desired (e.g., by widget 105).

Media processing server 118 may provide the processed media element, the modified frame, or both to widget 105 on user equipment 108 (e.g., through OPP 113). It should be understood that, in some embodiments, media processing server 118 may be the same server as server 114 and/or 116. Media processing server may also communicate with other servers 120, the latter of which may perform some or all of the processing steps.

Other servers 120 may include any suitable computer server equipment not mentioned in the description above. For example, other servers 120 may include image or video processing web sites or applications. In some embodiments, other servers 120 may transmit information to OPP 113 or to widget 105 (on user equipment 108) via network 130.

In some embodiments, video asset server 114, media element server 116, media processing server 118, or other servers 120 may respond to requests from OPP 113 to identify and process media elements and/or video frames. In other embodiments, these servers may periodically and/or continuously push information to OPP 113 to aid in the personalization of video assets, or to provide other data and/or interactive features to the user through user equipment 108, e.g., for use and/or display by widget 105.

FIG. 2 illustrates an example of generalized user equipment 200 that may be used to implement widget 105 in accordance with some embodiments of the present invention. User equipment 200 may be substantially the same as, or may be comprised within, user equipment devices 104 and 106 of FIG. 1, or user equipment 108. User equipment device 200 may receive and send information from service provider 102 and/or OPP 113 (FIG. 1) via input/output (hereinafter "I/O") path 202. I/O path 202 may provide data to control circuitry 204, which may include processing circuitry 206, user detection circuitry 207, and storage 208. I/O path 202 may connect control circuitry 204 (and specifically processing circuitry 206) to communications network 130 of FIG. 1. I/O functions may be provided by one or more communication paths, but are shown as a single path in FIG. 2 to avoid overcomplicating the drawing.

Control circuitry 204 may include any suitable processing circuitry 206 such as processing circuitry based on one or more microprocessors, microcontrollers, digital signal processors, programmable logic devices, etc. In some embodiments, control circuitry 204 executes instructions for widget 105 and/or other applications stored in memory (i.e., storage 208). In client-server based embodiments, control circuitry 204 may include communications circuitry suitable for communicating with networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (described in more detail in connection with FIG. 1). In addition, communications circuitry may include circuitry that enables peer-to-peer communication between user equipment devices, or communication between user equipment devices located remotely from each other (described in more detail in connection with FIG. 1).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 208 that is part of control circuitry 204. Storage 208 may include one or more of the above types of storage devices. For example, user equipment device 200 may include a hard drive for a DVR (sometimes called a personal video recorder, or PVR) and a DVD recorder as a secondary storage device. Storage 208 may be used to store various types of media and data described herein, including program information, widget settings, user preferences or profile information, media elements, video assets, or other data used in operating widget 105. Nonvolatile memory may also be used (e.g., to launch a boot-up routine and other instructions).

Control circuitry 204 may include video generating circuitry and tuning circuitry, such as one or more analog tuners, one or more MPEG-2 decoders or other digital decoding circuitry, high-definition tuners, or any other suitable tuning or video circuits or combinations of such circuits. For example, control circuitry may include a display driver for driving display 212, any number of buffers (e.g., to hold data to be displayed), and/or switching circuitry (e.g., to select which buffer contains the data to be displayed and/or which buffer should be read by the display driver). Encoding circuitry (e.g., for converting over-the-air, analog, or digital signals to MPEG signals for storage) may also be provided. Control circuitry 204 may also include scaler circuitry for upconverting and downconverting media into the preferred output format of the user equipment 200. Control circuitry 204 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive data for widget 105. The circuitry described herein, including for example, the tuning, video generating, encoding, decoding, scaler, switching, display driver, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc). If storage 208 is provided as a separate device from user equipment device 200, the tuning and encoding circuitry (including multiple tuners) may be associated with storage 208.

A user may issue commands to the control circuitry 204 using user input interface 210. User input interface 210 may be any suitable user interface, such as a remote control, mouse, trackball, keypad, keyboard, touch screen, touch pad, stylus input, joystick, voice recognition interface, or other user input interfaces. Display 212 may be provided as a stand-alone device or integrated with other elements of user equipment device 200. Display 212 may be one or more of a monitor, a television, a liquid crystal display (LCD) for a mobile device, or any other suitable equipment for displaying visual images. In some embodiments, display 212 may be HDTV-capable. Speakers 214 may be provided as integrated with other elements of user equipment device 200 or may be stand-alone units. The audio component of videos and other media content displayed on display 212 may be played through speakers 214. In some embodiments, the audio may be distributed to a receiver (not shown), which processes and outputs the audio via speakers 214.

In some embodiments, control circuitry 204 may include user detection circuitry 207 which may be capable of detecting and/or identifying a user or users without requiring the user or users to make any affirmative actions. Detection circuitry 207, for example, may identify users using any suitable biometric recognition technique, such as, facial recognition, heat signature recognition, odor recognition, scent recognition, body shape recognition, voice/speech recognition, behavioral recognition, iris recognition, retinal recognition, palm recognition, finger print recognition, or any other suitable biometric recognition technique. User equipment 200 may include biometric processing circuitry within user detection circuitry 207, and/or software that runs thereon, to enable such biometric recognition.

Generally, user detection circuitry 207 may include any suitable hardware and/or software to perform detection and identification operations. For example, detection circuitry 207 may include and/or interface with infrared, optical, and/or radio-frequency receivers and/or transmitters. Detection circuitry 207 may additionally, or alternatively, interface with one or more microphones and/or cameras (not shown) to detect audible and/or visual information, respectively. The microphone may be capable of receiving sounds within the audible range and/or outside the audible range. The camera may be capable of capturing information within the visual spectrum and/or outside the visual spectrum. For example, the camera may be able to capture infrared information, ultraviolet information, or any other suitable type of information. Detection circuitry 207 may additionally, or alternatively, interface with palm, fingerprint, and/or retinal readers (not shown) for detecting and/or identifying users. In some embodiments, detection circuitry 207 may provide (e.g., to processing circuitry 206 and/or storage 208) various detection and/or identification indications signifying whether a user is detected and/or identified.

Detection circuitry 207 may also be capable of detecting and/or identifying a user or users based on recognition and/or identification of a media device or media devices (e.g., a mobile device, such as an RFID device or mobile phone) that may be associated with the user or users. Detection circuitry 207 may recognize and identify such a device using any suitable technique, such as wireless identification. In particular, detection circuitry 207 may detect a wireless emission from the device and may, in some cases, identify the source of the emission, the type of emission, and/or identifying information within the emission. The emission may be, for example, identifiable as a standard wireless communications signal such as Bluetooth, Wi-Fi, WiMax, and LTE, or it may be any other short or long-range wireless signal (e.g., RFID, infrared, microwave, etc.). The device may communicate via any suitable protocol, which may be recognized and/or interpreted by detection circuitry 207, such as TCP/IP or any other suitable IEEE, industrial, or proprietary communication standards, or any other suitable electronic, optical, or auditory communication means.

In some embodiments, detection circuitry 207, using any suitable technique, may determine the distance, trajectory, and/or location of a user in relation to user equipment 200. For example, detection circuitry 207 may use a received signal strength indication (RSSI) (e.g., based on signals from a user's mobile device) to determine the user's distance from the user equipment. In addition, RSSI values may be used in a triangulation method to determine a user's general location in relation to user equipment 200. Detection circuitry 207 may also use, for example, a time differential of arriving signals to determine a user's location in relation to user equipment 200. In some embodiments, image processing, video processing, and/or computer vision techniques may be used to determine a user's distance, trajectory, and/or location in relation to user equipment 200. Moreover, a combination of the above described methods may be used simultaneously or sequentially to determine a user's distance, trajectory, and/or location in relation to user equipment 200.

In some embodiments, upon detecting a user, detection circuitry 207 may cause a camera (not shown) to capture an image of the detected user. The camera may use the determined distance, trajectory, and/or location of the user in relation to user equipment 200 to orient the camera and/or adjust the camera's focus. Alternatively, the user may be prompted, e.g., by an indication on display 212, to enter a capture frame of the camera. In some embodiments, the user may be presented with a real-time display of the camera input, e.g., on display 212. Similarly, an image captured by the camera may be displayed to the user, e.g., on display 212.

Detection circuitry 207 may, using any of the techniques above, determine that a user is within a predetermined range of user equipment 200, identify the user, and/or add the user to a list of active users at the user equipment. In addition, detection circuitry 207 may capture, locate, and/or store an image of the user in storage 208. The image may then be located, in some cases, via a media element search and/or the image may be incorporated into an object region of a video frame, as described in reference to FIG. 1. In some embodiments, when a user is detected by virtue of a media device, that media device may be searched to locate images.

In some embodiments, detection circuitry 207 (or an application thereon) may detect users via analysis of viewing behavior. For example, recent viewing activity (e.g., videos watched, channels accessed, etc.) and/or context of the viewing activity (e.g., time of day, day of week, etc.) may be compared to user profile information to determine the most likely user at user equipment 200. Moreover, detection circuitry 207 may detect users based on other applications or content recently or currently accessed using user equipment 200.

In some embodiments, detection circuitry 207 may not automatically detect users. Rather, in these embodiments, a user must manually initiate the detection process, e.g., via a user input interface 210. In still other embodiments, control circuitry 204 does not include user detection circuitry 207. In some of these embodiments, a user enters login information when accessing user equipment 200 (e.g., when loading a media guidance application or other interactive application). The user may then be identified based on the login information. In others of these embodiments, a user's presence may be assumed. For example, when a video asset is selected for display on a mobile device, the mobile device may assume the user is using and/or looking at the device. A camera in or attached to the device may then capture an image with the assumption that a user is in the capture frame. Alternatively, a real-time display of the camera's input may be displayed on the screen of the device and a user may manually indicate (e.g., via a button press) that an image should be captured. In another alternative, the camera's real-time input may be analyzed to detect and capture an image of a desired object (e.g., as specified in the personalization parameters associated with an object region of a video frame). The object may be, for example, a human face and the detection may employ facial recognition technology. Images captured by detection circuitry 207 may be stored, e.g., in storage 208.

It should be understood that user equipment 200 may be a representation of, or implemented within, user equipment 108 of FIG. 1, and may thus run widget 105. Accordingly, user detection circuitry 207 (and any associated detection hardware) may be used and/or activated by widget 105. User detection, for example, may only be initiated by widget 105 upon determining that a video asset has an object region and/or that no media elements are readily available to fill the object region. As another example, widget 105 may only initiate a user detection process when multiple object regions with different unique identifiers are identified. As yet another example, widget 105 may only initiate a user detection process when it is not otherwise clear which user desires to view the video asset and/or which media element to incorporate into an object region. Furthermore, as mentioned above in connection with FIG. 1, user equipment 200 may include a set-top box communicatively coupled to a television. In this embodiment, widget 105 may be implemented on the set-top box, the television, or both.

Figure 3:
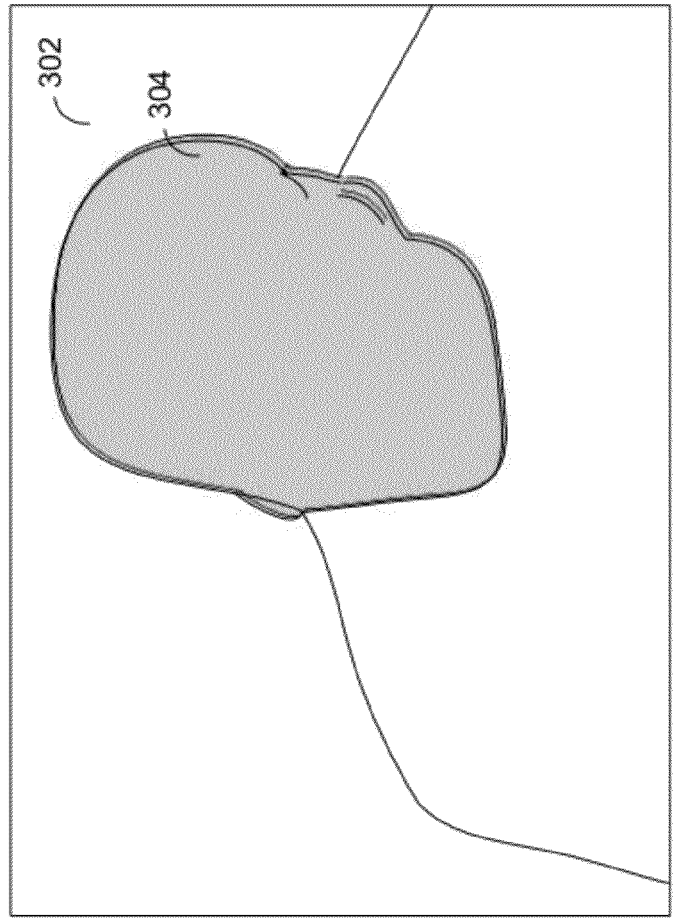
FIG. 3 illustrates an example of a video frame with an object region and a suitable media element for display therein in accordance with some embodiments of the present invention.
Figure 3:
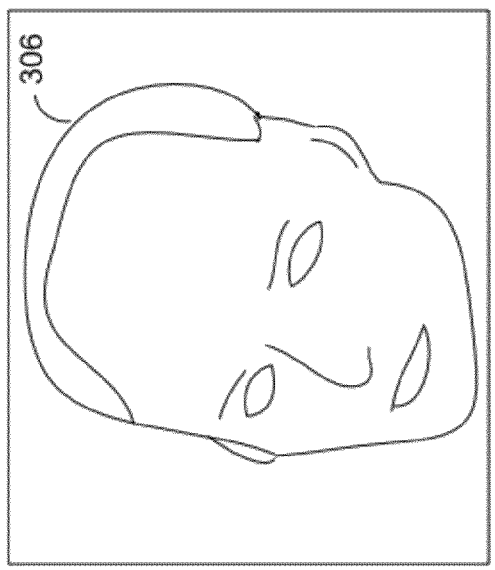

FIG. 3 shows an exemplary illustration 300 of a video frame 302 with an object region 304 and a suitable media element 306 for display therein in accordance with some embodiments of the present invention. As described above, a video asset may have any number of video frames with object regions indicative of an area of the frame that can be personalized. Object regions may be defined by a chroma key, a set of coordinates, a video artifact, or any other suitable data or indicator. As shown in illustration 300, video frame 302 may present an image of a person with a customizable face as designated by object region 304. By removing, replacing, overlaying, or making object region 304 transparent, for example, a substitute image (e.g., media element 306) may be displayed in the video frame instead. Media element 306 may be selected for insertion into video frame 302 in response to a determination that it substantially matches the area defined by object region 304. Alternatively, media element 306 may be a modified media element that was processed to produce a media element suitable for display within object region 304.

In some embodiments, object region 304 of video frame 302 may be defined by a visual artifact of the video frame itself. For example, a chroma key may be part of the video frame, e.g., a blue or green area. In this embodiment, an object region may be detected via image processing techniques such as color detection. In other embodiments, object region 304 of video frame 302 may be defined by non-visual data such as a coordinate set. This non-visual data may be provided within or along with the video asset, e.g., as metadata. It should be understood that, while object region 304 is shown in the shape of a human face, an object region maybe any shape and size, e.g., a rectangle, trapezoid, etc. In some embodiments, for example, object region 304 is a rectangle in which a rectangular image (e.g., a photograph) is displayed and/or embedded.

Although only one object region is shown in video frame 302, it should be understood that a video frame may have any number of object regions. Accordingly, a number of different media elements (or modified versions of the same element) may be incorporated within the object regions. As described above in connection with FIG. 1, widget 105 or OPP 113 may search for media elements stored at user equipment (e.g., in storage 208 of FIG. 2), or in a remote database (e.g., within media element server 116 of FIG. 1). The search may be based on personalization parameters associated with the object regions and/or user information (e.g., user profile information). For example, the personalization parameters may specify a size and content type of the desired media element, e.g., a 300×200 pixel image of a human face. User information may specify that the human face should be, or contain, the user's face (e.g., extracted from a picture of the user).

Personalization parameters may also include a unique identifier. Unique identifiers may be used to group object regions, for example, that should contain the same media element. For instance, three hundred consecutive frames may compose a ten second scene in a video asset (e.g., at thirty frames per second), and each frame may contain on object region for a media element that should remain consistent throughout the scene. In order to ensure the same media element is displayed in each frame (or that a version of the media element is displayed in each frame), each object region of the frames in the scene may be assigned the same unique identifier. Similarly, when multiple object regions in the same frame have the same unique identifier, the same media element may be chosen as the basis for each object region. For example, a frame may depict a woman looking into a mirror. The frame may contain two object regions: one in the area depicting the woman and another in the area depicting her reflection. The personalization preferences associated with the object regions may specify the same unique identifier, thus indicating that the same media element should be displayed in each object region; however, the personalization parameters associated with the object region in the area of the woman's reflection may specify that the media element should be flipped along the vertical axis.

Unique identifiers may also vary between object regions, indicating that dissimilar media elements may be chosen for the object regions. In one approach, distinct images of the same user may be chosen for each of the object regions. In another approach, images of different users may be chosen for object regions with differing unique identifiers. Personalization parameters may specify, for instance, that media elements associated with different users should be used for different object regions (e.g., one object region may be designated for a man and another for a woman). User information may be used to determine which users are of interest in locating and/or identifying media elements. For example, user information may indicate multiple users, or user information may be used to determine associates of the user (e.g., friends or family as identified using a social networking or ancestry web service). Alternatively, multiple users may have been detected (e.g., by detection circuitry 207 of FIG. 2).

In some embodiments, every frame in a sequence of frames need not contain an object region although the inclusion of a media element is desired in each of the frames. Instead, the first of the sequence may contain an object region and the associated personalization parameters may specify that the media element displayed within the object region should also be displayed in a number of consecutive frames, e.g., in an area of the consecutive frames corresponding to the object region of the first frame. The personalization parameters may thus specify the number of subsequent frames to be personalized with the media asset. For example, the personalization parameters could be used (e.g., by widget 105 of FIG. 1) to incorporate a media element into each frame of the sequence (starting from the first frame and continuing for the specified number of frames) in a location of the frames specified by the object region. This scheme reduces the amount of information necessary, for example, to personalize a scene of a video asset. In some embodiments, a single object region may be defined for the entire group of frames in the sequence, and data may specify which frames are in the scene.

Figure 4:
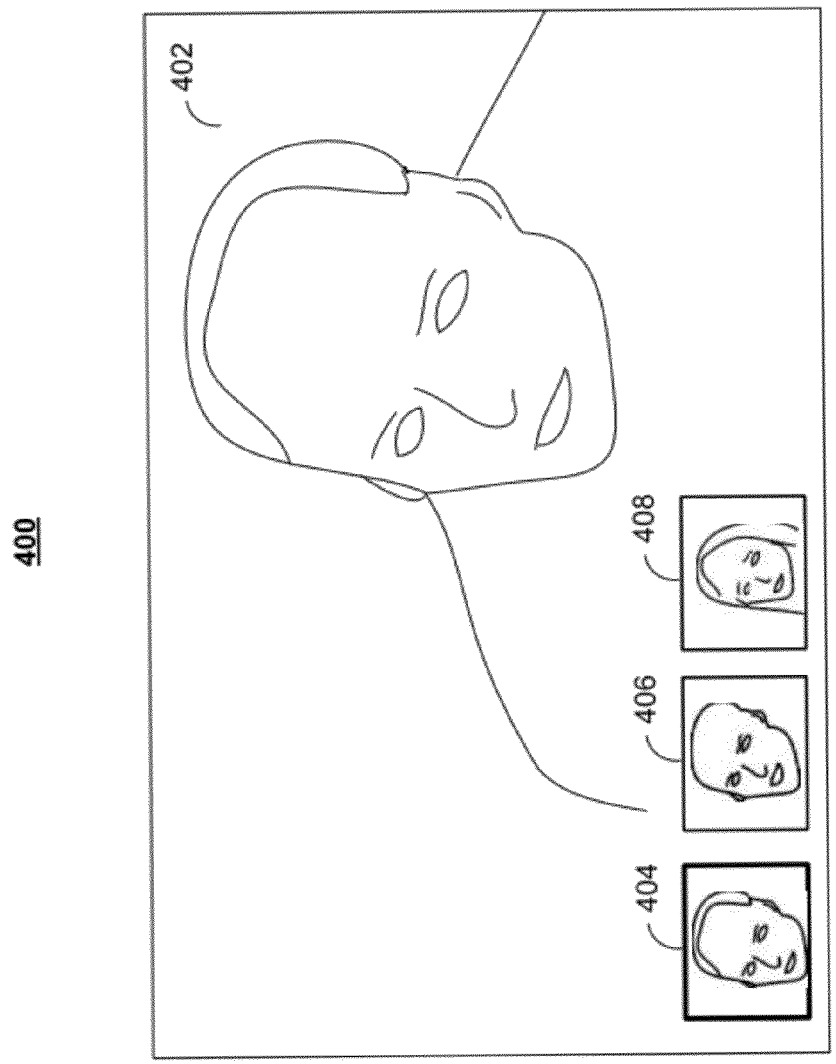
FIG. 4 illustrates an example of a media element selection screen in accordance with some embodiments of the present invention.

FIG. 4 illustrates an example of a media element selection screen 400 in accordance with some embodiments of the present invention. Media element selection screen 400 may allow a user to select a particular media asset for display in a frame 402 of a video asset. Media element selection screen 400 may be displayed to the user (e.g., on display 212 of FIG. 2) in a number of different scenarios. As described above, in some embodiments, a search may be performed to locate media elements suitable for display in an object region of a video frame. This search may, in some cases, return multiple results. Widget 105 (or OPP 113) of FIG. 1 may arbitrarily select one of the results, it may select a best matching result, or it may employ some other suitable selection scheme or algorithm. However, the multiple matching media elements may also be displayed to the user for selection, e.g., as display elements 404, 406, and 408. In other embodiments, multiple users may be detected or indicated within retrieved user information. Accordingly, a media element for each user may be presented for selection, e.g., as display elements 404, 406, and 408. In yet other embodiments, no search for media elements may be performed. Instead, a user may be prompted to select a media element of his choosing. For example, a user may navigate a directory structure to select a location that contains images of interest, or a set of images may be automatically located on user equipment and/or network-accessible storage devices. The images may then be displayed to the user for selection, e.g., as display elements 404, 406, and 408. When multiple object regions are available (e.g., with different unique identifiers), selection screen 400 may be presented for each target frame. The term "target frame" is used herein to refer to a frame that contains an object region into which a media element will be incorporated. In some embodiments, when a media element is selected for one object region, it is prevented from being selected for another object region (e.g., it may be removed as a display element from selection screen 400).

Selection screen 400, as shown, depicts display element 404 with a thick border, which indicates that the media element represented by the display element is currently selected for insertion into the object region of frame 402. Frame 402 may accordingly be displayed with the selected media element embedded within the object region (as shown). A user may select a different display element, e.g., elements 406 or 408, and, as a result, frame 402 may be displayed with the newly selected media element. Display elements 404-408 may be icons or other representations of their corresponding media elements. The display elements may be selectable, e.g., using user interface device 210 of FIG. 2.

Figure 5:
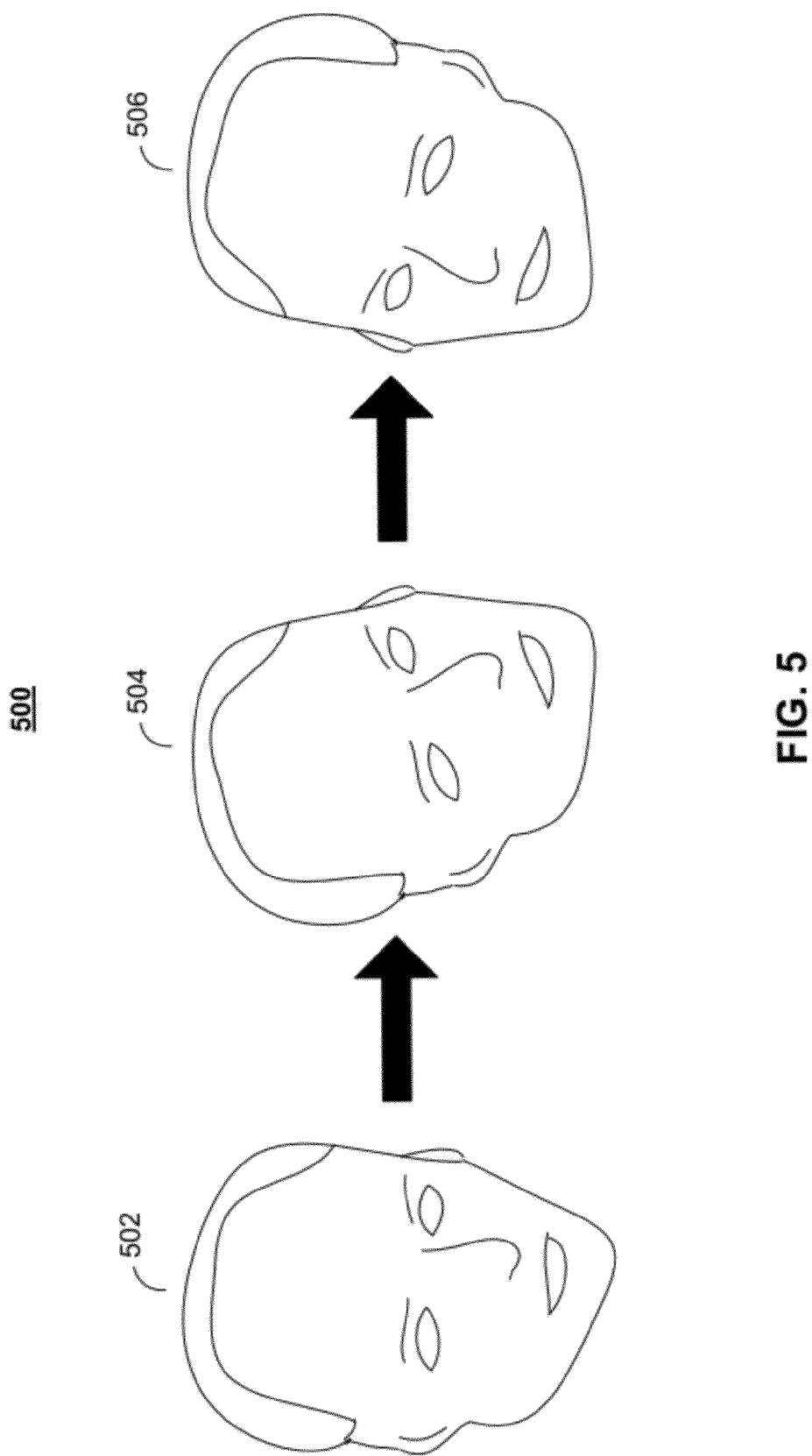
FIG. 5 illustrates an example of processing steps applied to a media element to produce a modified version of the media element in accordance with some embodiments of the present invention.

A media element is not always immediately embeddable into a frame. In some cases, the media element must be modified for the particular object region and/or frame into which it is to be inserted, e.g., according to the characteristics of the object region (e.g., size and/or shape), the characteristics of the frame (e.g., frame color palette and/or histogram statistics), the personalization parameters associated with the object region (e.g., orientation and/or content designation), user equipment display requirements (e.g., image format), etc. FIG. 5 illustrates an example of a couple processing steps 500 that may be applied to a media element to produce a modified version of the media element in accordance with some embodiments of the present invention.

A media element 502, for instance, may be identified for insertion into frame 302 of FIG. 3. As depicted, media element 502, although suitable for display within object region 304 of FIG. 3, may not be in an ideal or required form for insertion. In particular, media element 502 would not be an ideal "fit" for object region 304, since the shape of the object region differs from that of media element 502. Accordingly, media element 502 may be rotated to produce media element 504, and then flipped about its vertical axis to produce media element 506. Media element 506 may then be in a shape substantially the same as the target object region.

As described in connection with FIG. 1, and as will be discussed further below in connection with FIG. 19, a media element may be processed in many different ways, including extracting a portion of the media element (e.g., using facial recognition technology), altering the geometrical properties of the media element, adjusting the color properties of the media element, adjusting the resolution and/or quality of the media element, applying a filter (e.g., a blur filter) to the media element, adding shadow and/or highlight features to the media element, converting the media element from one format to another (e.g., from a JPEG to a Device Independent Bitmap), or a combination thereof. In addition, as will be described below in connection with FIGS. 10A and 10B, the processing may be performed at user equipment or at a remote server (e.g., server 118 of FIG. 1).

Figure 6:
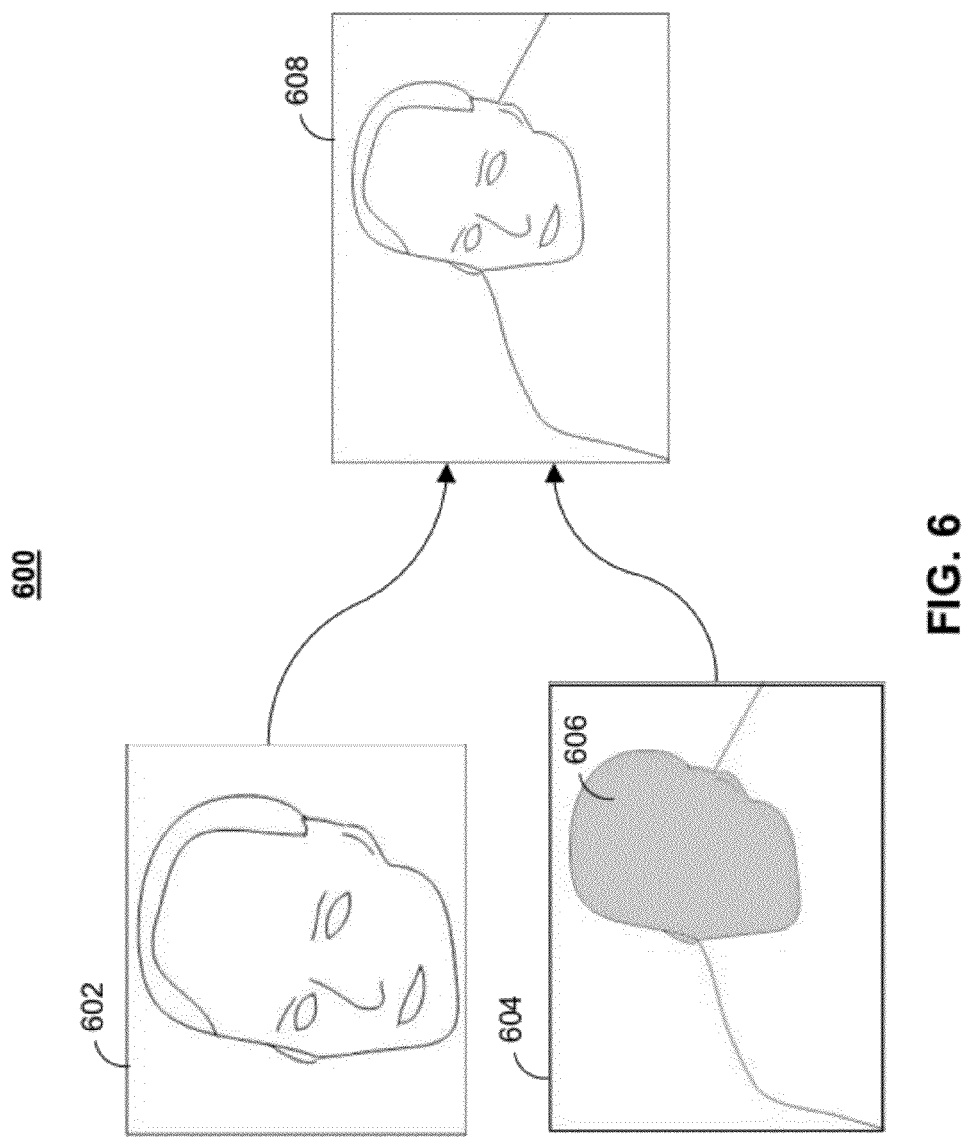
FIG. 6 illustrates an example of combining a media element with a video frame to produce a modified frame in accordance with some embodiments of the present invention.

Turning to FIG. 6, exemplary illustration 600 depicts a combination process whereby a media element 602 is combined with a video frame 604 to produce a modified frame 608 in accordance with some embodiments of the invention. Techniques may be employed (e.g., by widget 105 or media processing server 118 of FIG. 1) for ensuring media element 602 is combined with frame 604 in a manner that results in a modified frame 608 that appears "natural" (e.g., a final image that appears normal, smooth, contiguous, and seamless along the edges of media element 602 as displayed within modified frame 608). For example, media element 602 may be positioned within modified frame 608 in an area corresponding to object region 606. In some embodiments, media element 602 may be centered over object region 606. In other embodiments, media element 602 may be positioned according to the boundaries of object region 606. In yet other embodiments, media element 602 may be analyzed to extract image characteristics and those characteristics may be used in positioning media element 602 relative to object region 606. For example, media element 602 may be subjected to facial recognition and positioned so that facial features appear in their "correct" place relative to the image displayed in frame 608. In some embodiments, modified frame 608 may be processed so as to harmoniously "blend" media element 602 within the frame. For example, the transition area between media element 602 and the rest of frame 608, e.g., as defined by the border of object region 606, may be smoothed or blurred.

As will be described in greater detail below, combining media element 602 with video frame 604 may be performed in a number of ways. In one approach, media element 602 may be embedded within video frame 604, such that a new frame—modified frame 608—is generated. In an alternative approach, media element 602 may remain independent of video frame 604, but may appear to be integrated within frame 604 when presented onscreen by display circuitry. For example, as will be discussed in detail in connection with FIG. 7, switching circuitry may be used so that, as a scan line moves across a display, the image content of frame 604 is displayed for all portions of the frame other than object region 606; the image content of media element 602 is displayed otherwise.

When media element 602 is embedded within frame 604 to produce modified frame 608, the embedding may be affected by any suitable technique. For example, the area of frame 604 corresponding to object region 606 may be removed, made transparent, overlaid, or otherwise obscured or filtered in order to reveal media element 602. Modified frame 608 may then be displayed or stored along with, or as part of, the video asset.

Figure 7:
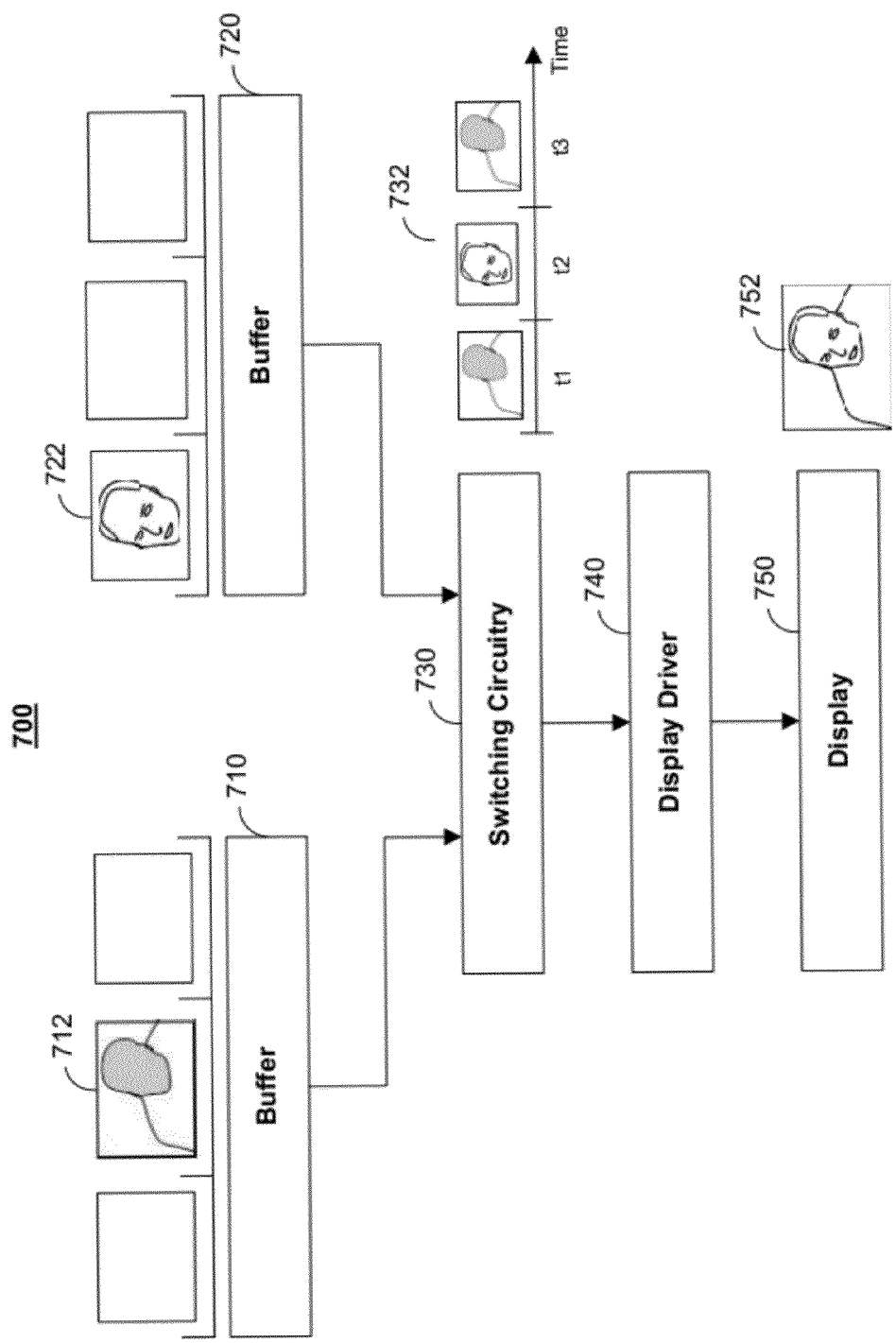
FIG. 7 illustrates an exemplary implementation of FIG. 6 using buffers and switching circuitry in accordance with some embodiments of the present invention.

FIG. 7 illustrates an exemplary implementation 700 of FIG. 6 using buffers and switching circuitry in accordance with some embodiments of the present invention. The circuitry and devices shown in FIG. 7 may be contained, for example, in user equipment 200 of FIG. 2. Implementation 700 allows media element 722 to appear integrated within frame 712 when presented onscreen by display circuitry (e.g., by display driver 740) while remaining independent of video frame 712. In general, switching circuitry 730 provides data from one of buffers 710 and 720 to display driver 740. Display driver 740, in turn, drives display 750, for example, by providing, in real-time, the data for each scan line as it moves across display 750.

When displaying a video asset to a user, all or some of the video asset's video frames may be preloaded into buffer 710 and/or a portion of the video frames may be periodically or continuously loaded into buffer 710 as the video asset is displayed. In addition, when one or more of the video frames has an associated object region (e.g., frame 712), a media element 722 for display within the object region may be loaded into buffer 720. Media element 722 may be preloaded when the video asset is timed to be displayed, or it may be loaded when necessary (e.g., when the video frame 712 with the object region is loaded into buffer 710). Although shown as two different buffers, buffers 710 and 720 may be portions of a single buffer. Moreover, additional buffers may be available and used to store, for example, video frames of the video asset.

Switching circuitry 730 is configured to select only one of buffers 710 and 720 at any particular time, during which it may provide, or allow access to, the data in the selected buffer. As shown, for example, in time graph 732, switching circuitry 730 may provide access to the data of buffer 710 during a first time interval, the data of buffer 720 during a second time interval, the data of buffer 710 during a third time interval, and so on. The times at which switching circuitry 730 swaps which buffer is selected may be determined by what portion of frame 712 is being sent to display 750 by display driver 740. For example, when portions of frame 712 other than the object region are timed for display, switching circuitry 730 may select buffer 710 and provide the image data of frame 712 to display driver 740 to drive the scan line across display 750. When portions of frame 712 corresponding to the object region are timed for display, on the other hand, switching circuitry 730 may select buffer 720 and provide the image data of media element 722 to display driver 740 to drive the scan line across display 750. The result, as seen by the user, is an integrated frame 752 that presents media element 722 within the object region of frame 712. It should be understood that switching circuitry 730 may not swap buffers when a frame without an object region is being displayed.

Figure 8:
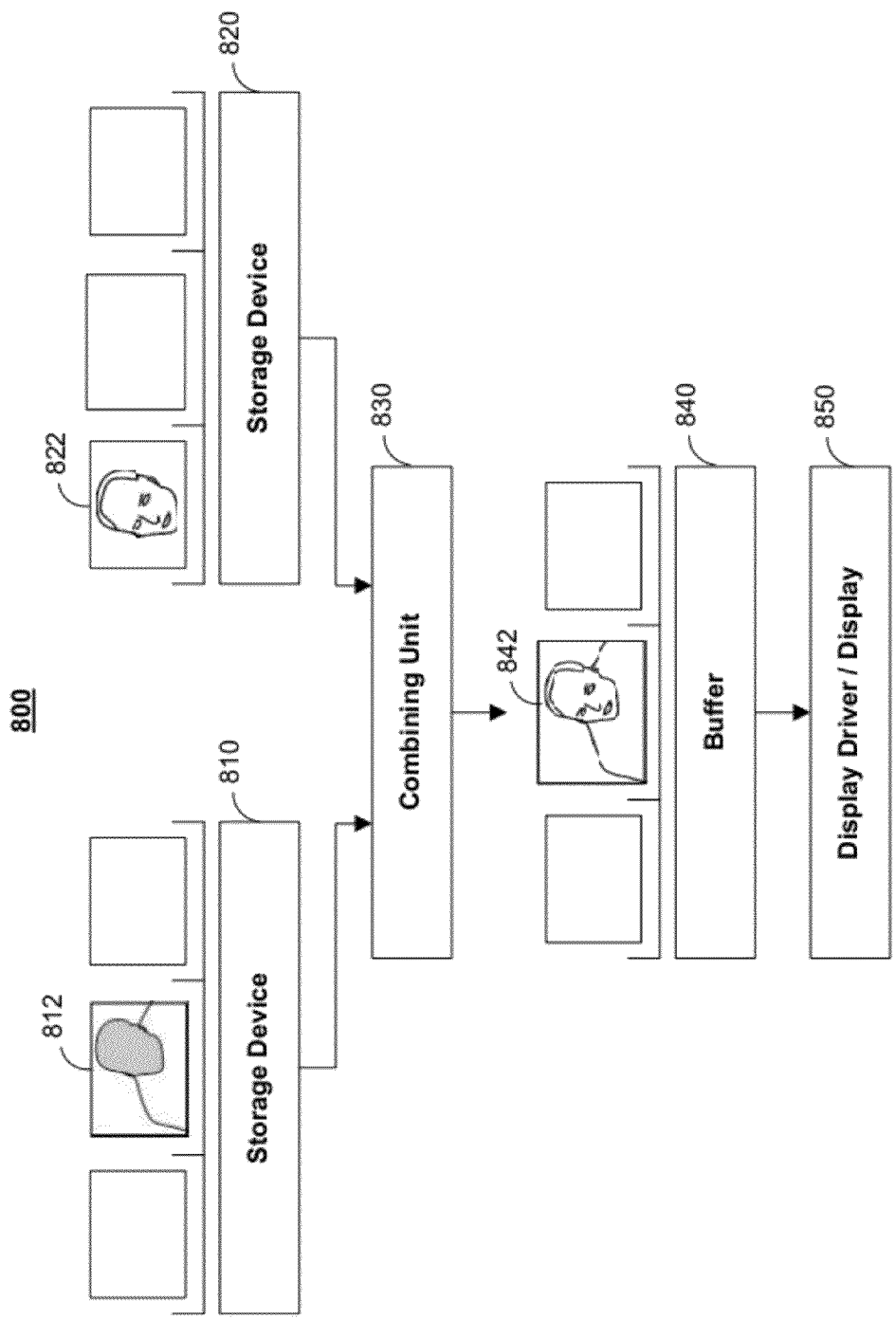
FIG. 8 illustrates an exemplary implementation of FIG. 6 using storage devices, a combining unit, and/or a buffer in accordance with some embodiments of the present invention.

FIG. 8 illustrates an exemplary implementation 800 of FIG. 6 using storage devices, a combining unit, and/or a buffer in accordance with some embodiments of the present invention. The circuitry and devices shown in FIG. 8 may be contained, for example, in user equipment 200 of FIG. 2. Alternatively, combining unit 830, for example, may be located remotely (e.g., at media processing server 118 of FIG. 1). Implementation 800, as opposed to implementation 700 of FIG. 7, embeds a media element 822 within a video frame 812 to produce a modified frame 842 for display. In this implementation, media element 822 may not remain a distinct image element within modified video frame 842, but may become a true portion of the frame, replacing the previous image content.

As shown in FIG. 8, video frame 812 may be stored at storage device 810, e.g., after the video asset is received by user equipment. Media element 822 may be stored in storage device 820, e.g., by the user or in response to identifying the media element in a remote database or at a remote server (e.g., server 116 of FIG. 1). Storage devices 810 and 820 may be any suitable storage mediums, such as buffers or non-volatile storage devices. In some embodiments, storage devices 810 and 820 may be part of storage 208 of FIG. 2. Prior to displaying the video asset, combining unit 830 may embed media element 822 within the object region of frame 812 to produce modified frame 842. Media element 822 may be embedded using any of the embedding techniques described above in connection with FIG. 6. Modified frame 842 may be stored back in storage device 810, for example, in place of frame 812. Additionally, or alternatively, modified frame 842 may be loaded into buffer 840 along with other video frames of the video asset when the video asset (or portion of the video asset including frame 842) is timed for display. Display driver/display 850 may then access buffer 840 to display the frames of the video asset, including modified frame 842.

Figure 9:
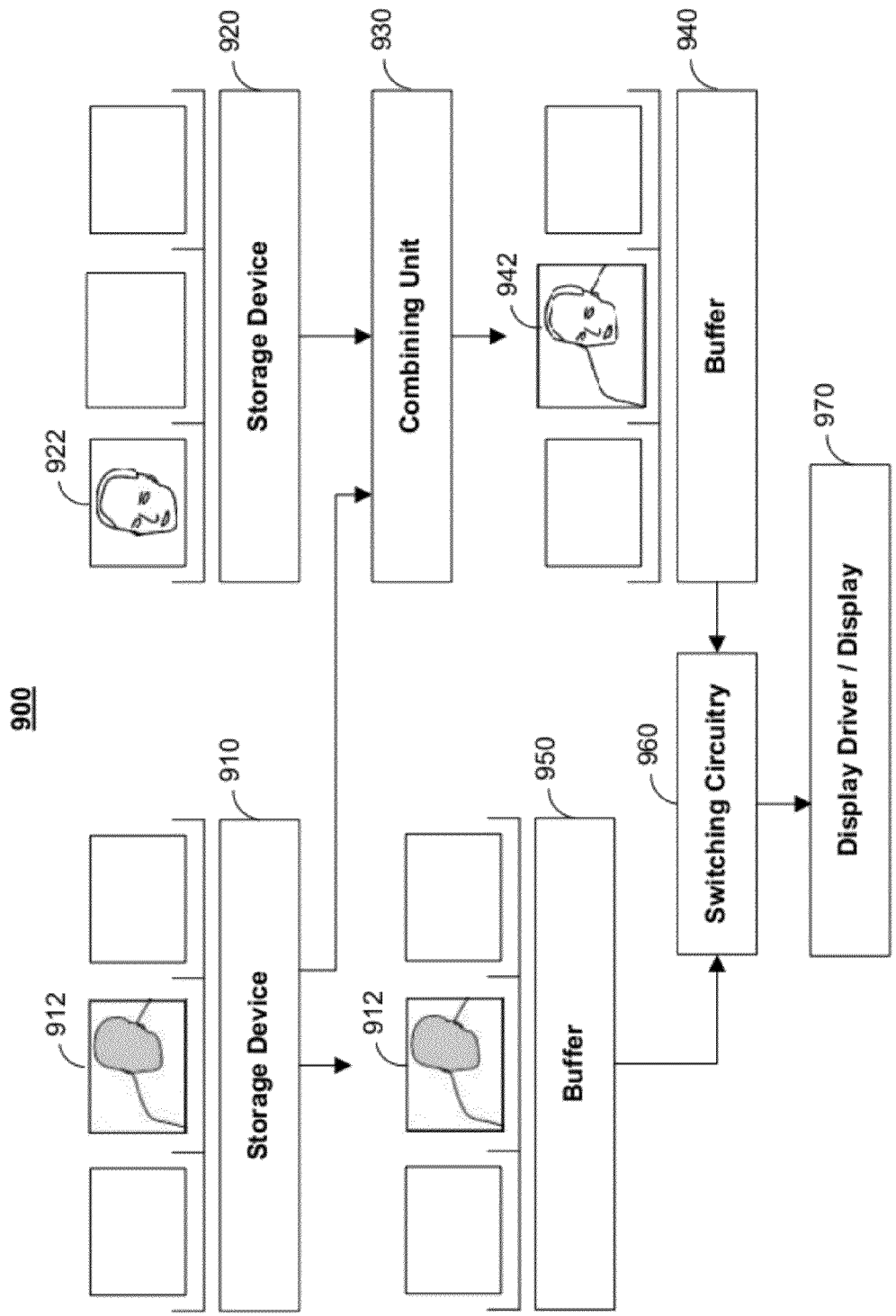
FIG. 9 illustrates an exemplary implementation of FIG. 6 using storage devices, a combining unit, buffers, and/or switching circuitry in accordance with some embodiments of the present invention.

FIG. 9 illustrates an exemplary implementation 900 of FIG. 6 using storage devices, a combining unit, buffers, and/or switching circuitry in accordance with some embodiments of the present invention. The circuitry and devices shown in FIG. 9 may be contained, for example, in user equipment 200 of FIG. 2. Alternatively, combining unit 930, for example, may be located remotely (e.g., at media processing server 118 of FIG. 1). Implementation 900, as opposed to implementation 800 of FIG. 8, may switch between a video frame with an object region and a modified frame embedding a media element on the fly, as will now be described.

As shown in FIG. 9, video frame 912 may be stored at storage device 910, e.g., after the video asset is received by user equipment. Media element 922 may be stored in storage device 920, e.g., by the user or in response to identifying the media element in a remote database or at a remote server (e.g., server 116 of FIG. 1). Storage devices 910 and 920 may be any suitable storage mediums, such as buffers or non-volatile storage devices. In some embodiments, storage devices 910 and 920 may be part of storage 208 of FIG. 2. Prior to displaying the video asset, combining unit 930 may embed media element 922 within the object region of frame 912 to produce modified frame 942. Media element 922 may be embedded using any of the embedding techniques described above in connection with FIG. 6. Modified frame 942 may be loaded into buffer 940, e.g., when the video asset (or portion of the video asset including frame 912) is timed for display. At substantially the same time, video frame 912 may be loaded, along with other video frames of the video asset, into buffer 950.

Switching circuitry 960 is configured to select only one of buffers 940 and 950 at any particular time, during which it may provide, or allow access to, the data in the selected buffer. For example, switching circuitry 960 may provide access to the data of buffer 950 during a first time interval, the data of buffer 940 during a second time interval, the data of buffer 950 during a third time interval, and so on. The times at which switching circuitry 960 swaps which buffer is selected may be determined by what video frame is timed for presentation on display 970. More specifically, switching circuitry may select buffer 950 when displaying non-personalized frames (e.g., frames without object regions) and buffer 940 otherwise. For example, when frames other than frame 912 are timed for display, switching circuitry 960 may select buffer 950 and provide the image data of frame 912 to display driver/display 970. When frame 912 is timed for display, on the other hand, switching circuitry 960 may select buffer 940 and provide the image data of frame 942 to display driver/display 970.

In some embodiments, switching circuitry 960 may determine when to switch buffers based on a predetermined schedule, e.g., that indicates when a frame that has a modified counterpart is to be displayed. In other embodiments, switching circuitry 960, or a routine running on control circuitry (e.g., widget 105 of FIG. 1), may look ahead at frames in buffer 950 to determine which have modified counterparts. When a modified counterpart is detected, switching circuitry may provide data (e.g., image data corresponding to modified frame 942) to display driver/display 970 from buffer 940. In yet other embodiments, switching circuitry 960, or a routine running on control circuitry (e.g., widget 105 of FIG. 1), may look ahead at frames in buffer 940 to determine when modified frames are present. Video frames in buffer 950 that correspond to these modified frames may then be identified (e.g., using a frame identifier common to both the unmodified frames and their modified counterparts). When the identified unmodified frames are timed for display, switching circuitry 960 may provide data instead from buffer 940. In still other embodiments, a database or other data record (e.g., metadata associated with the video asset) may include a list of frames with modified counterparts. Switching circuitry 960 (or widget 105 of FIG. 1, which may control switching circuitry 960) may compare frames in buffer 950 to the frames in the list and, when a match is found, may switch to buffer 940 when the time comes to display that frame.

Figure 10A:
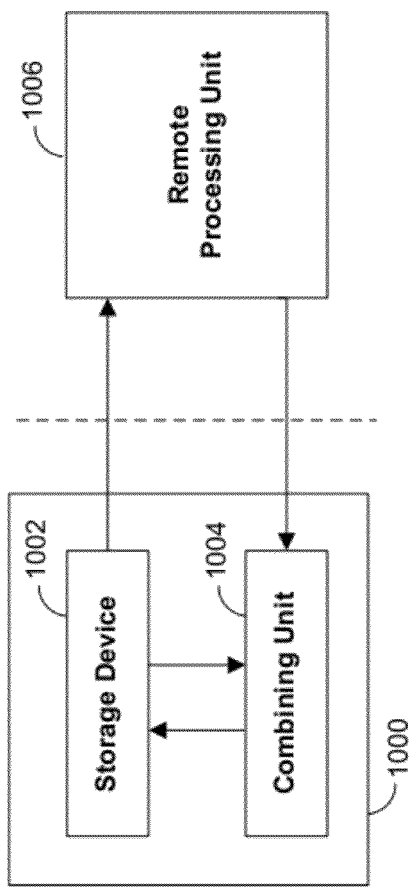
FIG. 10A illustrates an exemplary system for remotely processing a media element and locally combining the result with a video frame to produce a modified frame in accordance with some embodiments of the present invention.

FIG. 10A illustrates an exemplary system for remotely processing a media element and locally combining the result with a video frame to produce a modified frame in accordance with some embodiments of the invention. In particular, local user equipment 1000 may include storage device 1002 and combining unit 1004. User equipment 1000 may be substantially the same as user equipment 200 of FIG. 2, with storage device 1002 corresponding to storage 208 and combining unit part of processing circuitry 206. Alternatively, storage device 1002 may represent one or more buffers at the user equipment.

Storage device 1002 may include a media element for insertion into a frame with an object region. As shown, the media element may be transmitted to a remote server, e.g., remote processing unit 1006. Remote processing unit 1006 may be substantially the same as media processing server 118 of FIG. 1, and may communicate with user equipment 1000 through network 130 of FIG. 1 (e.g., the Internet). Remote processing unit 1006 may process (i.e., modify) the media element in accordance with personalization parameters and/or other data, as explained above and as will be described below in greater detail in connection with FIG. 19. The modified version of the media element may then be returned (e.g., via network 130 of FIG. 1) to user equipment 1000. Specifically, the modified media element may be provided to combining unit 1004, where it may be embedded within the object region of the video frame to produce a modified media frame. The modified frame may be displayed or it may be stored, in turn, within storage device 1002.

It should be understood that the indications of processing flow in FIG. 10A are illustrative only and that the storage, processing, and combining steps may be performed at any suitable time and in any suitable order. For example, in some embodiments, when a modified media element is provided to user equipment 1000, it is first stored in storage device 1002 and, at a later time, combined into a modified video frame using combining unit 1004.

Figure 10B:
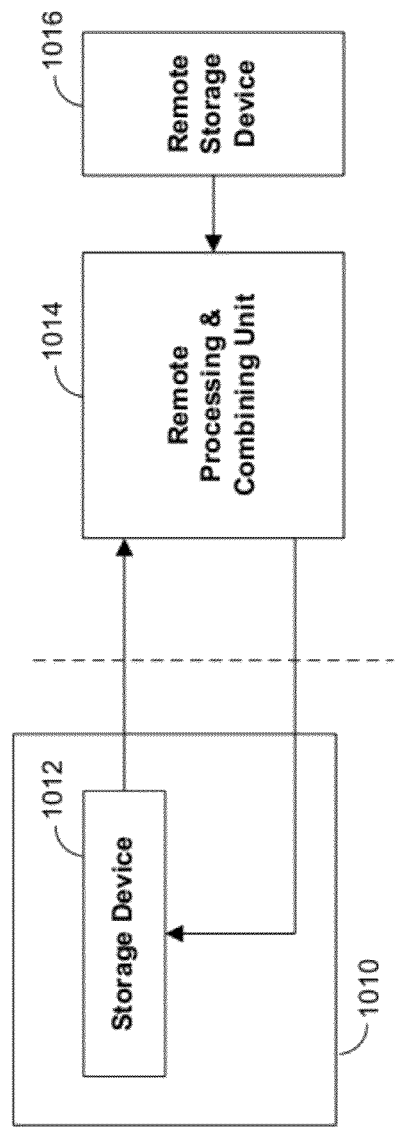
FIG. 10B illustrates an exemplary system for remotely processing a media element and remotely combining the result with a video frame to produce a modified frame in accordance with some embodiments of the present invention.

FIG. 10B illustrates an exemplary system for remotely processing a media element and remotely combining the result with a video frame to produce a modified frame in accordance with some embodiments of the invention. In particular, local user equipment 1010 may include storage device 1012. User equipment 1010 may be substantially the same as user equipment 200 of FIG. 2, with storage device 1012 corresponding to storage 208. Alternatively, storage device 1012 may represent one or more buffers at the user equipment. Storage device 1012 may include a media element for insertion into a frame with an object region. As shown, the media element may be transmitted to a remote server, e.g., remote processing & combining unit 1014.

Remote unit 1014 may be substantially the same as media processing server 118 of FIG. 1, and may communicate with user equipment 1010 through network 130 of FIG. 1 (e.g., the Internet). Remote unit 1014 may process (i.e., modify) the media element in accordance with personalization parameters and/or other data, as explained above and as will be described below in greater detail in connection with FIG. 19. Remote unit 1014 may then embed the modified version of the media element within a video frame to produce a modified media frame. In one embodiment, remote unit 1014 receives the original video frame to be modified from user equipment 1010 (e.g., retrieved from storage device 1012) and embeds the modified media element therein (e.g., in a location corresponding to the object region). In another embodiment, remote unit 1014 receives a copy of the original video frame from remote storage device 1016. Remote storage device may be the source of the video asset, e.g., video asset server 114 of FIG. 1. Remote unit 1014 may embed the modified media element in a location of the duplicate frame corresponding to the object region of the original frame. The modified frame may then be returned (e.g., via network 130 of FIG. 1) to user equipment 1010, where it may be displayed and/or stored in storage device 1012.

It should be understood that the indications of processing flow in FIG. 10B are illustrative only and that the storage, processing, and combining steps may be performed at any suitable time and in any suitable order. For example, in some embodiments, when after remote unit 1014 produces a modified version of the media element, it may return the modified media element to user equipment 1010. Then, at a later time, the modified media element may be transmitted back to remote unit 1014 for embedding into the video frame.

It should be understood that some or all processing steps, data flow, and devices depicted in and described in connection with FIGS. 3-10 may be controlled by widget 105 and/or OPP 113 of FIG. 1. For example, widget 105 may control all local storage devices, buffers, switching circuitry, combining circuitry, and display driver circuitry. Moreover, widget 105 may communicate with OPP 113, as described in connection with FIG. 1, to perform any or all of the media identification, processing, combining, and displaying steps. Broadly, it should be understood that widget 105 may initiate, control, and/or perform all tasks and provide all functionality required to personalize video assets for users.

The following flow charts serve to illustrate processes involved in some embodiments of the invention. Where appropriate, these processes may, for example, be implemented completely in the processing circuitry of a user equipment device (e.g., control circuitry 204 of FIG. 2) or may be implemented at least partially in a remote server (e.g., servers 122 of FIG. 1). Moreover, these processes may be initiated, performed, and/or controlled by widget 105 or OPP 113 of FIG. 1 or a combination thereof. It should be understood that the steps of the flow charts are merely illustrative and any of the depicted steps may be modified, omitted, or rearranged, two or more of the steps may be combined, or any additional steps may be added, without departing from the scope of the invention.

Figure 11:
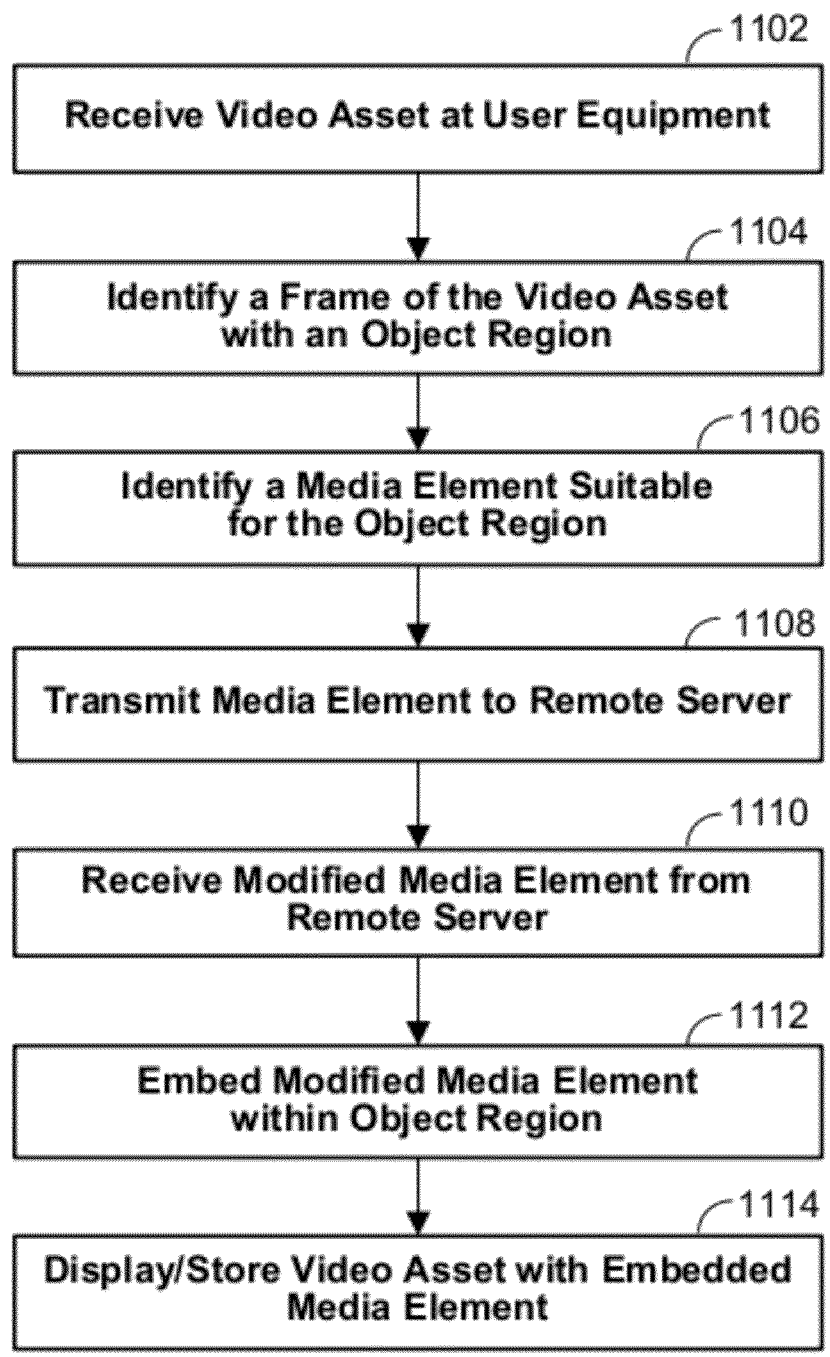
FIG. 11 illustrates a flow chart of an exemplary process for embedding a media element within a video frame in accordance with some embodiments of the present invention.

Turning to FIG. 11, illustrative flow chart 1100 is shown depicting an exemplary process for embedding a media element within a video frame in accordance with some embodiments of the present invention. At step 1102, a video asset is received at user equipment (e.g., user equipment 108 of FIG. 1). The video asset may be stored upon reception, e.g., in a storage device at the user equipment (e.g., storage 208 of FIG. 2). In response to receiving the video asset, widget 105 may be invoked. Alternatively, widget 105 may be invoked when, or right before, the video asset is displayed, or when a user indicates a desire to display the video asset. In another alternative, widget 105 may be invoked only upon detection of a frame with an object region (e.g., in step 1104).

At step 1104, the video asset may be reviewed to determine if the video asset contains any personalizable video frames, i.e., frames with object regions demarcating an area of the frame that may be replaced, overlaid, or otherwise substituted with other content. Frames with object regions are identified and/or personalization parameters associated with the object regions may be retrieved. The personalization parameters may be used in steps 1106 and 1112 to, respectively, identify media elements and embed media elements within the object regions. The personalization parameters may also be transmitted, at step 1108, to a remote server. Personalization parameters may be received with the video asset, e.g., as metadata, or retrieved from a remote data store (e.g., databases 112 of FIG. 1).

In some embodiments, widget 105 may identify the frames in the video asset that have object regions. In other embodiments, another process or application may be configured to identify the frames in the video asset that have object regions. Identification may be achieved by searching the video asset for frames with object regions. Alternatively, a data record may be provided listing frames that are modifiable. This data record may be associated with, or may be contained in, the video asset.

At step 1106, a media element suitable for display within an object region is identified. When multiple object regions have been identified in step 1104, multiple media elements may be identified. For purposes of brevity, the description that follows refers to only one object region and one media element but should be understood to apply and/or be adaptable to multiple object regions and/or multiple media elements.

Media elements may be identified using any suitable data including the aforementioned personalization parameters and user information (e.g., from a user profile stored at user equipment). Media elements may be located on user equipment or on a remote server (e.g., a social networking service). In some embodiments, a media element may be generated using, for example, a camera attached to or incorporated within user equipment. When multiple media elements are identified for a single object region, a user may be prompted to choose one of the media elements or a media element may be chosen automatically (e.g., randomly or in accordance with a selection algorithm). At step 1108, the identified media element may be transmitted to a remote server, e.g., where it may be processed (see FIG. 14).

At step 1110, a modified version of the media element may be received at user equipment from the remote server. The modified media element may be stored at user equipment, e.g., in a buffer or other storage device. At step 1112, the modified media element may be embedded within the object region of the video frame to produce a modified frame, as discussed above. References herein to embedding a media element within an object region of a frame should be understood to mean that a media element is merged into an area of the frame corresponding to the object region. Finally, at step 1114, the modified frame may be stored, e.g., along with the video asset and/or in place of the original frame. The modified frame may alternatively, or additionally, be displayed to the user.

Figure 12:
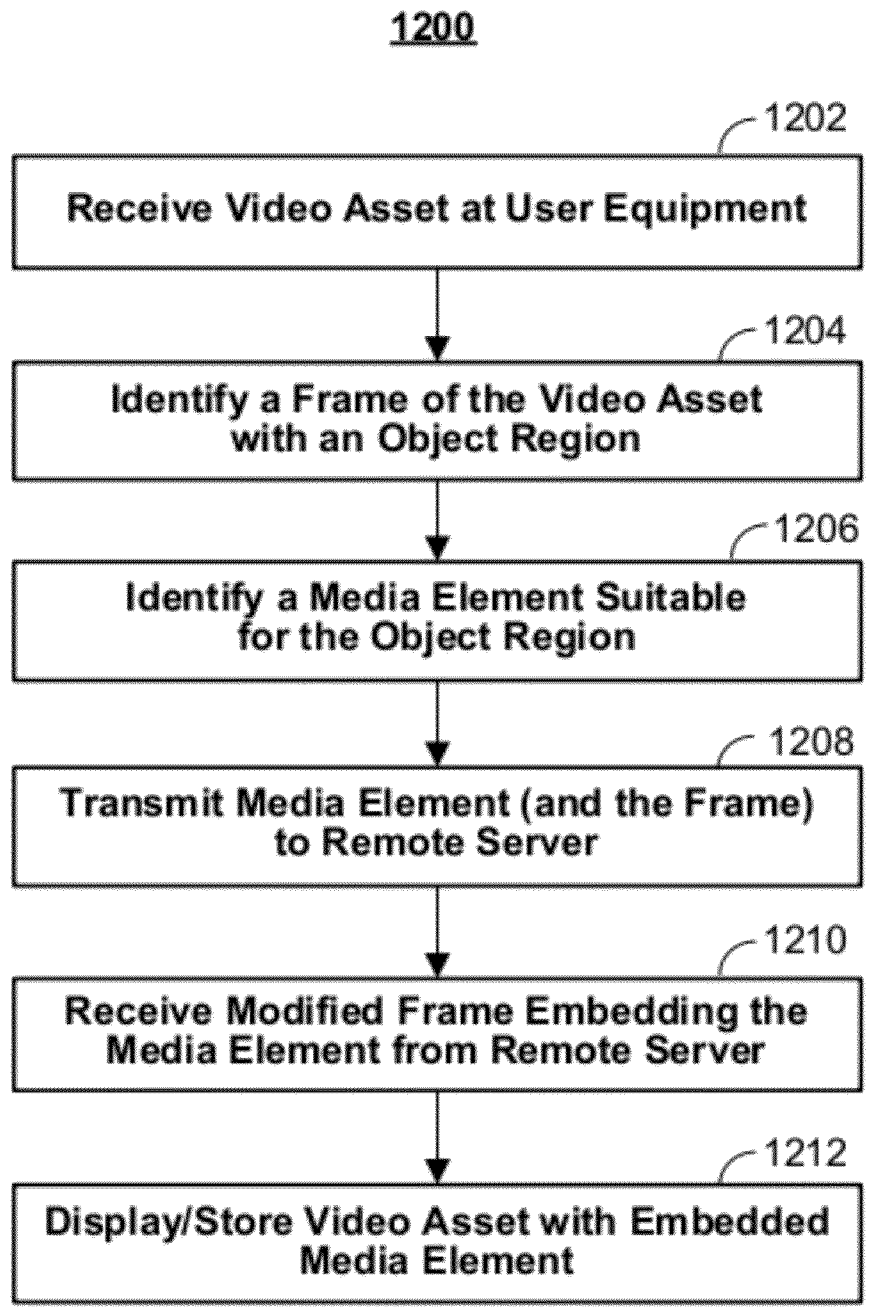
FIG. 12 illustrates a flow chart of an exemplary process for receiving a modified video frame embedding a media element from a remote server in accordance with some embodiments of the present invention.

Referring now to FIG. 12, illustrative flow chart 1200 is shown depicting an exemplary process for receiving a modified video frame embedding a media element from a remote server in accordance with some embodiments of the present invention. Steps 1202, 1204, 1206, and 1212 may be substantially the same as and may include the same techniques and features of steps 1102, 1104, 1106, and 1114, respectively, of FIG. 11. Accordingly, in the interest of brevity, a description of these steps is not repeated. The process illustrated by flow chart 1200 differs from that depicted in FIG. 11 at step 1208. At step 1208, the media element identified in step 1206 may be provide to a remote server. Moreover, in some embodiments, the frame containing the object region may also be provided to the remote server, which may both process and embed the media element within the transmitted frame. In other embodiments, a copy of the frame including the object region may be retrieved by the remote server, e.g., from the source of the video asset, as described above in connection with FIG. 10B.

At step 1210, a modified frame embedding the media element (or a processed version of the media element) may be received at user equipment from the remote server. Finally, at step 1212, the modified frame may be stored, e.g., along with the video asset and/or in place of the original frame. The modified frame may be stored at user equipment, e.g., in a buffer or other storage device. The modified frame may alternatively, or additionally, be displayed to the user.

Figure 13:
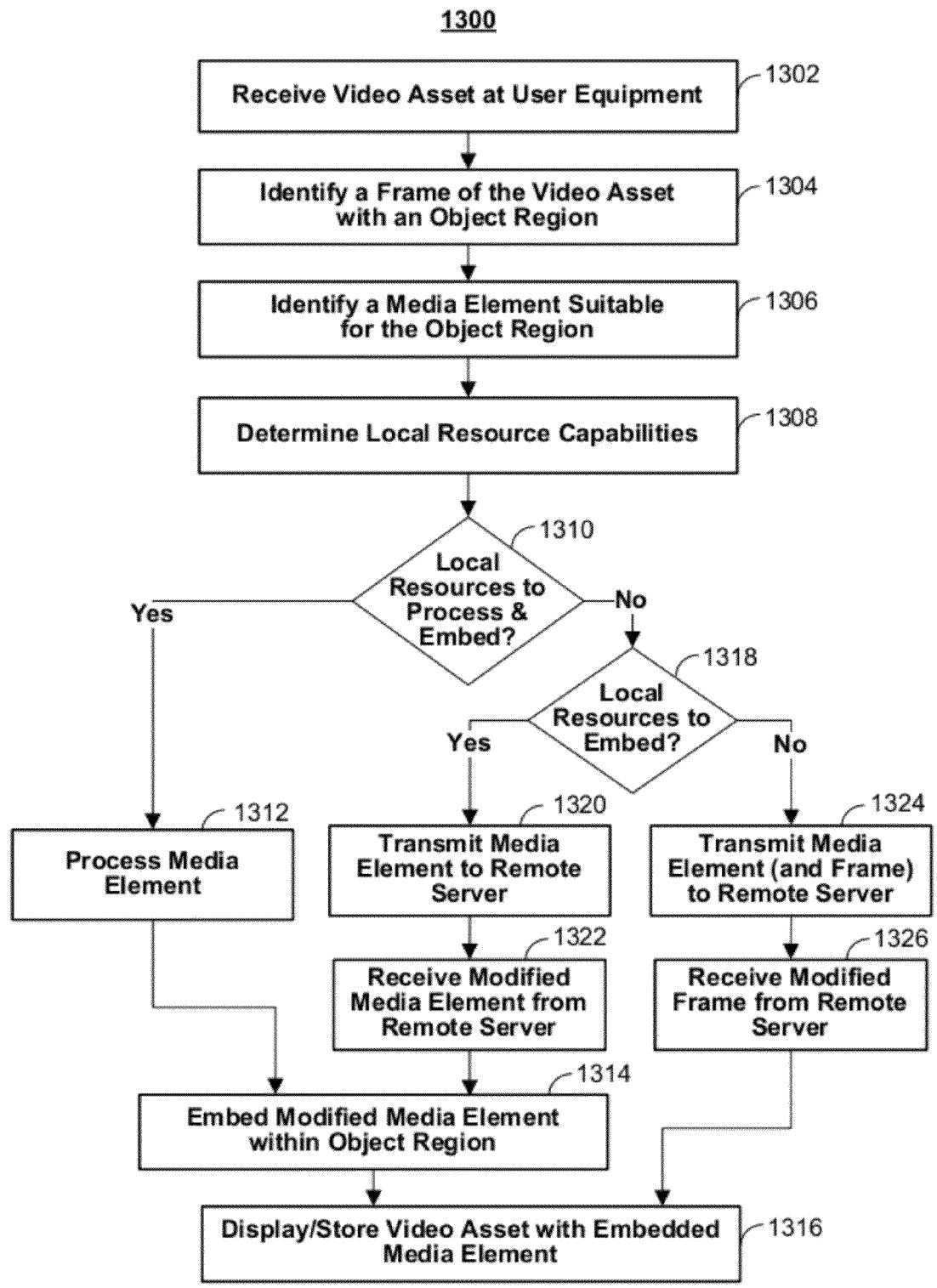
FIG. 13 illustrates a flow chart of an exemplary process for generating or receiving a modified video frame embedding a media element depending on the capability of local processing resources in accordance with some embodiments of the present invention.

FIG. 13 shows an illustrative flow chart 1300 depicting an exemplary process for generating or receiving a modified video frame embedding a media element depending on the capability of local processing resources in accordance with some embodiments of the present invention. Steps 1302, 1304, and 1306 may be substantially the same as and may include the same techniques and features of steps 1102, 1104, and 1106, respectively, of FIG. 11. Accordingly, in the interest of brevity, a description of these steps is not repeated. The process illustrated by flow chart 1300 differs from that depicted in FIG. 11 at step 1308.

In step 1308, the local processing resources may be determined. For example, widget 105 of FIG. 1 may poll user equipment 108 to determine its processing capabilities. Determining processing resources may include determining processing speed, information passing bandwidth, memory and non-volatile storage capacity (e.g., a number of buffers available), and/or image processing features (e.g., as implemented in hardware and/or software). In addition, it may be determined if switching circuitry is available and/or the switching speed of such circuitry. Determining processing resources may also include determining whether widget 105 may access and/or control the available processing resources.

At step 1310, the process (e.g., widget 105 of FIG. 1) determines if sufficient local resources were identified at step 1308 to process a media element, to produce a modified version of the media element, and to embed the modified version of the media element in a frame of the video asset. In particular, it may be determined if sufficient local resources may provide this functionality in a reasonable amount of time or within a certain amount of time of displaying the modified frame. If so, the local user equipment may proceed to process, at step 1312, the media element previously identified at step 1306. Processing the media element will be described in greater detail in connection with FIG. 19. At step 1314, the processed (i.e., modified) media element may then be embedded within the object region of the video frame. Step 1314 may be substantially the same as, and may include the same techniques and features of, step 1112 of FIG. 11. Accordingly, in the interest of brevity, a description of this step is not repeated.

If, in step 1310, it is determined that sufficient local resources were not identified at step 1308 to handle both the processing and embedding, the process may proceed to step 1318. At step 1318, it may be determined if sufficient local resources were identified for handling the embedding of a pre-modified version of the media element in a frame of the video asset. If so, the process may proceed to step 1302, where the media element identified in step 1306 may be transmitted to a remote server. At step 1322, a modified version of the transmitted media elements may be received by the user equipment from, e.g., the remote server. Steps 1302 and 1322 may be substantially the same as, and may include the same techniques and features of, steps 1108 and 1110 of FIG. 11. Accordingly, in the interest of brevity, a detailed description of these steps is not repeated. Following step 1322, the process may continue with steps 1314 and 1316, discussed above.

Figure 14:
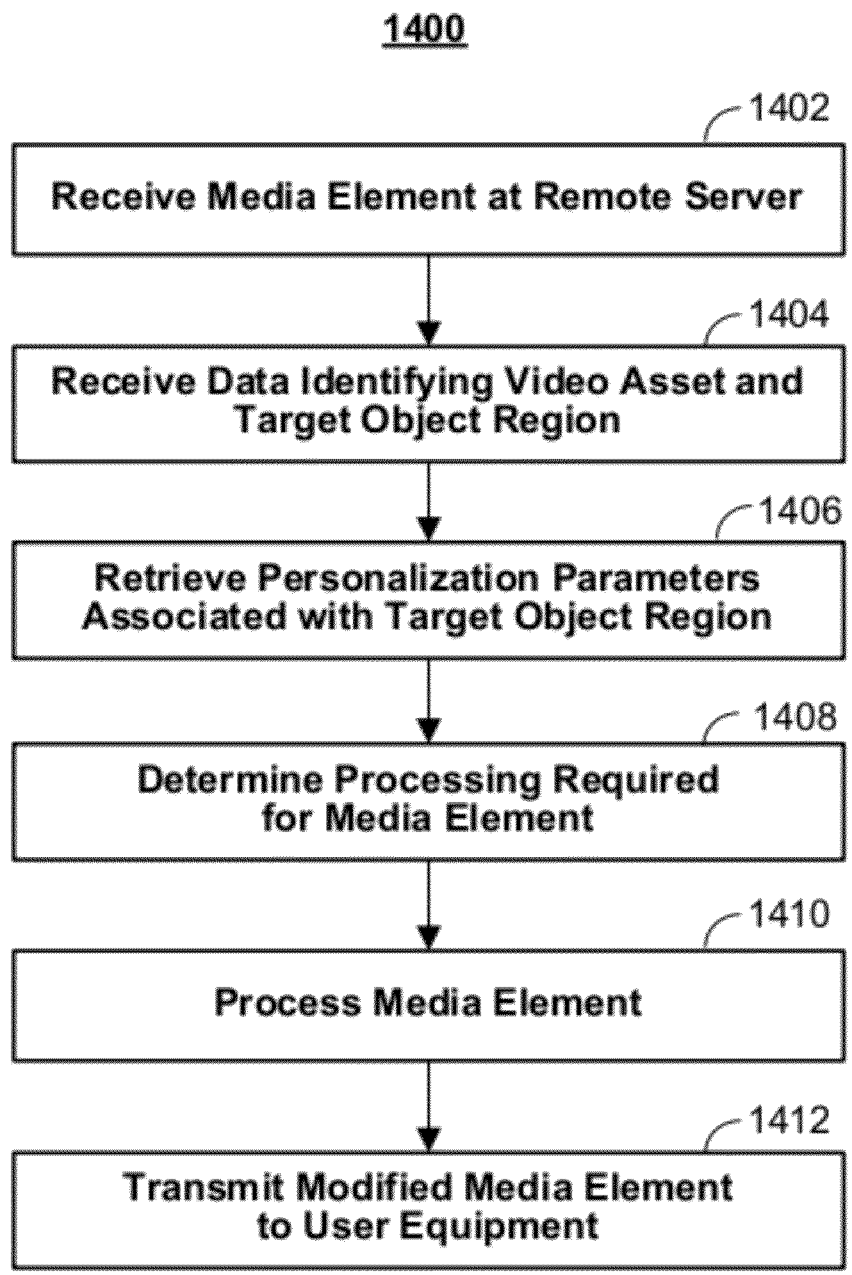
FIG. 14 illustrates a flow chart of an exemplary process for processing a media element at a remote server in accordance with some embodiments of the present invention.

If, in step 1318, it is determined that sufficient local resources were not identified at step 1308 to handle media element embedding, the process may proceed to step 1324, where the media element may be transmitted to the remote server, which may perform the processing and embedding tasks (see FIG. 14). In some embodiments, the user equipment may transmit, in addition to the media element, the video frame with the object region to be used for the embedding. In step 1326, a modified frame (e.g., the target video frame embedding the media element) may be received at user equipment. Steps 1324 and 1326 may be substantially the same as, and may include the same techniques and features of, steps 1208 and 1210 of FIG. 12. Accordingly, in the interest of brevity, a detailed description of these steps is not repeated. Following step 1326, the process may continue with step 1316, discussed above.

FIG. 14 shows an illustrative flow chart 1400 depicting an exemplary process for processing a media element at a remote server in accordance with some embodiments of the present invention. At step 1402, the media element may be received at the remote server (e.g., media processing server 118 of FIG. 1). The media element may be transmitted directly from user equipment 108 of FIG. 1, e.g., using widget 105. Alternatively, the media element may be provided by service provider 102, OPP 113, or media element server 116, all of FIG. 1. In some embodiments, if no media element is transmitted to the remote server, the remote server may be configured to retrieve a default media element (e.g., from databases 112 of FIG. 1). In addition to the media element, the remote server may receive data to guide the processing and modification of the media element. This data may include, for example, personalization parameters associated with the target media object and/or user information. The data may also include information identifying the media element or information describing the visual appearance and/or content of media element (e.g., metadata).

At step 1404, the remote server may receive data identifying the target video asset, target frame within the video asset, and/or the target object region within the frame. This data may be received in addition to, or in lieu of, the data received at step 1402. This data may be used, for example, to process the media element in accordance with the video asset and/or frame with which it will be later combined. For example, the data may include, or may be used to derive, display characteristics of the target video asset and/or target frame (e.g., a color palette, histogram data, etc.). These display characteristics may then be used in processing the media element to, for example, ensure the media element has the same "look and feel" as the target frame and/or video asset. As another example, the data may be used to determine the geometric properties (e.g., boundaries, shape, etc.) of the target object region. These geometric properties may be used to shape and size the media element accordingly. In some embodiments, more than one media element may be received at step 1402 for the same target object region. In this embodiment, the data received at step 1404 (e.g., together with any data received at step 1402) may be used in a selection algorithm to select the most suitable one of the elements.

At step 1406, personalization parameters may be retrieved. The personalization parameters may be associated with the target object region, the target frame, and/or the target video asset. The personalization parameters may have been previously received from the user equipment at step 1402, or may be retrieved from a remote database (e.g., databases 112 of FIG. 1) using the identifying data received at step 1404. At step 1408, the required processing is determined, e.g., from any or all of the data described above (e.g., the personalization parameters, user information, and/or any information associated with or determined from the media element, target object region, target frame, and/or target video asset).

At step 1410, the processing may be performed, in accordance with the determinations made in step 1408, to produce a modified version of the media element (or simply "modified media element"). Processing media elements is described in detail in connection with FIG. 19. Finally, at step 1412, the modified media element may be transmitted back to the user equipment. In some embodiments, the modified media element may be additionally stored in the remote server or an external database (e.g., databases 112 of FIG. 1). In one approach, the modified media element may then be retrieved from storage and provided to user equipment upon receipt of a future processing request, e.g., for the same media element and the same or similar target object region. In this approach, the remote server can save time and processing resources by fulfilling repeat requests with stored data.

Figure 15:
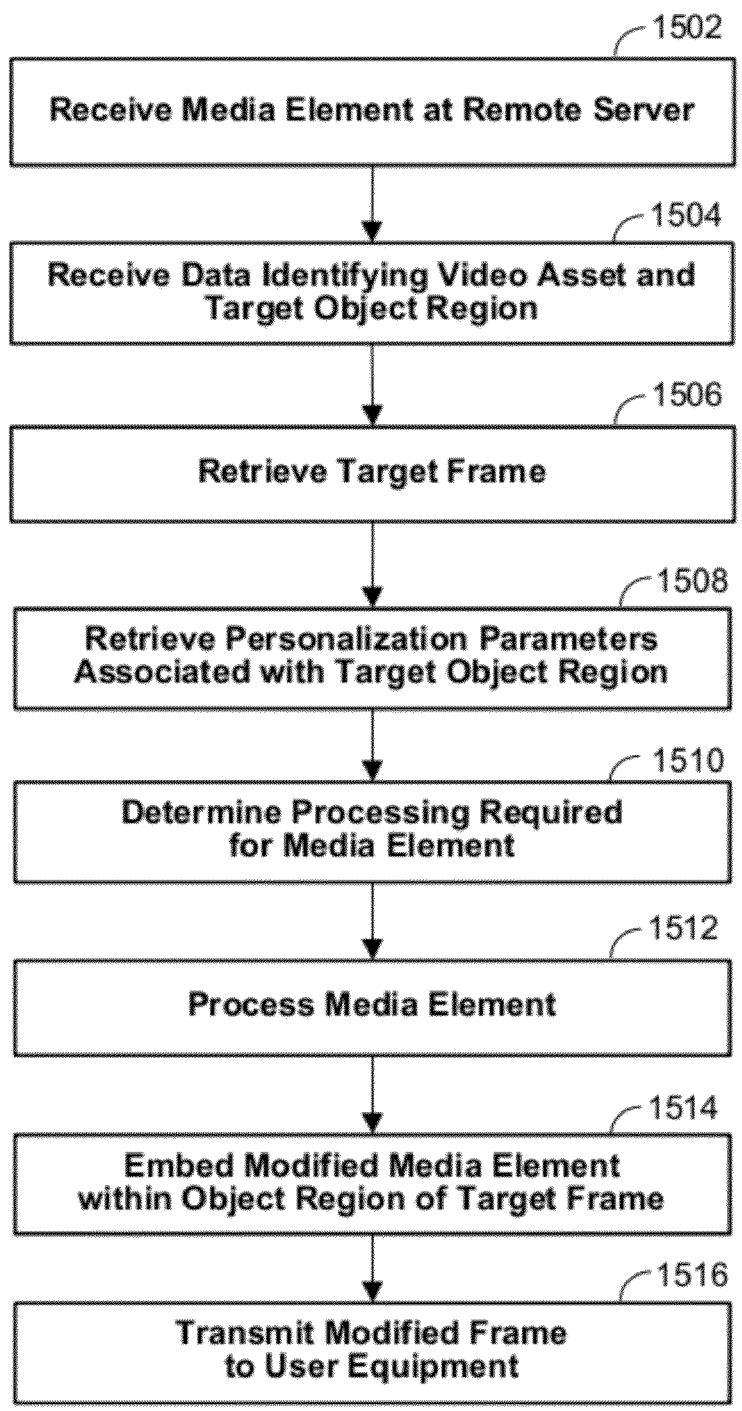
FIG. 15 illustrates a flow chart of an exemplary process for retrieving a video frame stored remotely and embedding a media element therein at a remote server in accordance with some embodiments of the present invention.

Turning to FIG. 15, an illustrative flow chart 1500 is shown that depicts an exemplary process for retrieving a video frame stored remotely and embedding a media element therein at a remote server in accordance with some embodiments of the present invention. Steps 1502 and 1504 may be substantially the same as, and may include the same techniques and features of, steps 1402 and 1404, respectively, of FIG. 14. Accordingly, in the interest of brevity, a description of these steps is not repeated. The process illustrated by flow chart 1500 differs from that depicted in FIG. 14 at step 1506.

At step 1506, a copy of the target frame is retrieved from a remote database (e.g., from databases 112 of FIG. 1) or the video asset source (e.g., video asset server 114 of FIG. 1). A copy of the target frame may be identified using the data identifying the target video asset, the target frame, and/or the target object region received at step 1504. For example, the target frame may have an associated identifier, which may be used within a query term sent to a remote server or database. As another example, the target frame may be associated with an index, which may be used to locate the frame within the video asset (e.g., itself associated with an identifier, which can be used to locate the video asset).

The process may then proceed to step 1508, where personalization parameters (e.g., associated with the target object region, target frame, and or target video asset) may be retrieved. The personalization parameters may have been previously received from the user equipment at step 1502, or may be retrieved from a remote database (e.g., databases 112 of FIG. 1) using the identifying data received at step 1504. In addition, the personalization parameters may be have been received along with the target frame in step 1506. Personalization parameters, as described above, may include display properties, content characteristics, and/or a unique identifier associated with, and/or descriptive of, the target object region, target frame, and/or target video asset. Moreover, the personalization parameters may include, or be provided with, user information, or any other suitable information (e.g., information that may be useful in determining the processing required for the media element).

At step 1510, the processing required for the media element received in step 1502 may be determined, e.g., based on the personalization parameters and other information derived from the target object region, target frame, and/or target video asset. At step 1512, the media element may be processed to produce a modified version of the media element. Steps 1510 and 1512 may be substantially the same as, and may include the same techniques and features of, steps 1408 and 1410, respectively, of FIG. 14. Accordingly, in the interest of brevity, a description of these steps is not repeated. The process then proceeds with step 1514, where the modified media element is embedded within the frame retrieved at step 1506 to produce a modified frame. At step 1516, the modified frame may be transmitted back to the user equipment. In some embodiments, the modified media element and/or frame may be additionally stored in the remote server or an external database (e.g., databases 112 of FIG. 1). In one approach, the modified media element and/or modified frame may then be retrieved from storage and provided to user equipment upon receipt of a future processing request, e.g., for the same media element and the same or similar target object region. In this approach, the remote server can save time and processing resources by fulfilling repeat requests with stored data.

Figure 16:
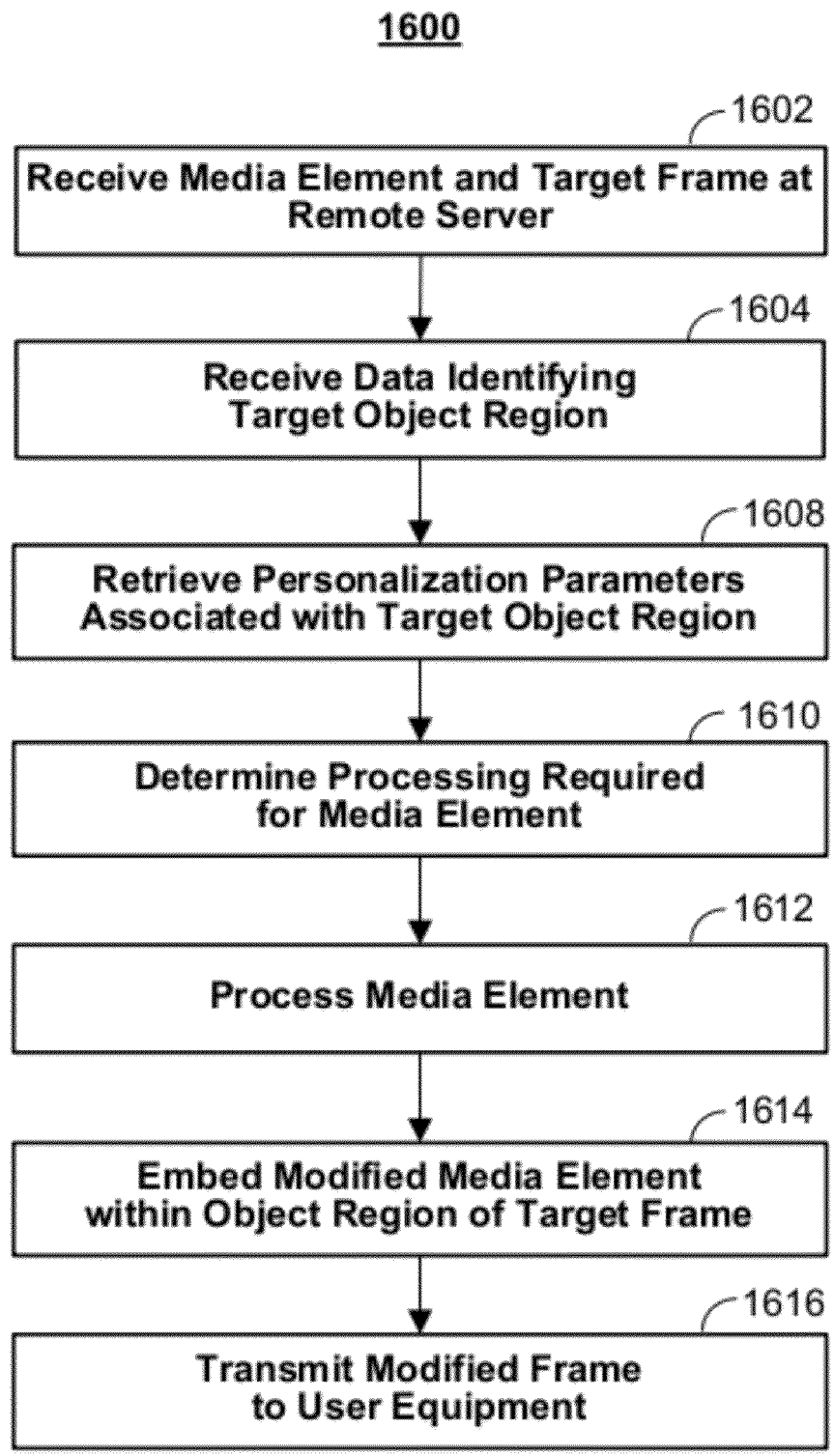
FIG. 16 illustrates a flow chart of an exemplary process for embedding a media element in a received video frame at a remote server in accordance with some embodiments of the present invention.

FIG. 16 shows illustrative flow chart 1600 depicting an exemplary process for embedding a media element in a received video frame at a remote server in accordance with some embodiments of the present invention. At step 1602, the media element and target frame may be received at the remote server (e.g., media processing server 118 of FIG. 1). The media element and target frame may be transmitted directly from user equipment 108 of FIG. 1, e.g., using widget 105. Alternatively, the media element and target frame may be provided by service provider 102, OPP 113, or media element server 116 all of FIG. 1. In some embodiments, if no media element is transmitted to the remote server, the remote server may be configured to retrieve a default media element (e.g., from databases 112 of FIG. 1). In addition to the media element and target frame, the remote server may receive data to guide the processing and modification of the media element. This data may include, for example, personalization parameters associated with the target media object and/or user information. The data may also include information identifying the media element and/or target frame, or the data may include information describing the visual appearance and/or content of media element and/or target frame (e.g., metadata).

At step 1604, data identifying the target object region may be received. This information may include, for example, an identifier or coordinates for locating the object region within the target frame received at step 1602. This data may be used, for example, in step 1614 to embed the media element in the proper location of the frame. This data may also be used, for example, to process the media element in accordance with the video asset, frame, and or region of the frame with which it will be later combined. For example, the data may include, or may be used to derive, display characteristics of the target video asset and/or target frame (e.g., a color palette, histogram data, etc.). These display characteristics may then be used in processing the media element to, for example, ensure the media element has the same "look and feel" as the target frame and/or video asset. As another example, the data may be used to determine the geometric properties (e.g., boundaries, shape, etc.) of the target object region. These geometric properties may be used to shape and size the media element accordingly.

At step 1608, personalization parameters associated with the target object region may be retrieved. At step 1610, the processing required for the media element may be determined, and, at step 1612, the media element may be processed in accordance with the determinations. Finally, at step 1614, the modified media element is embedded within the object region identified, for example, by the data received in step 1604. A modified frame may thus be produced, which may then be transmitted to the user equipment at step 1616. Steps 1608-1616 may be substantially the same as, and may include the same techniques and features of, steps 1508-1516, respectively, of FIG. 15. Accordingly, in the interest of brevity, a description of these steps is not repeated.

Figure 17:
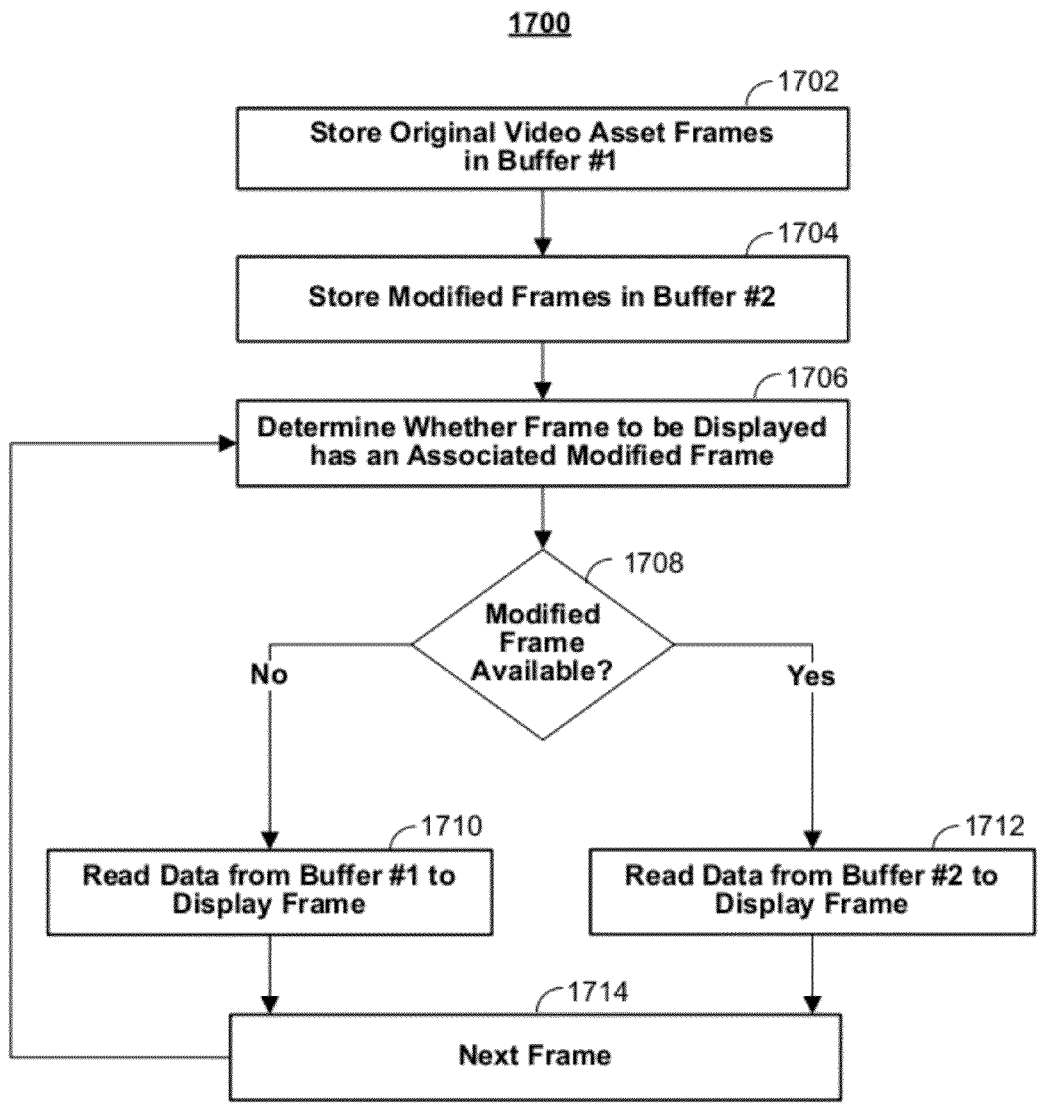
FIG. 17 illustrates a flow chart of an exemplary process for displaying a video asset with a modified frame in accordance with some embodiments of the present invention.

Referring now to FIG. 17, an illustrative flow chart 1700 is shown depicting an exemplary process for displaying a video asset with a modified frame in accordance with some embodiments of the present invention. The process described by flow chart 1700 may be implemented, for example, using the devices and circuitry depicted in FIG. 9, including storage device 910, storage device 920, combining unit 930, buffer 940, buffer 950, switching circuitry 960, and/or display driver/display 970. In some embodiments, the process described by flow chart 1700 (and/or the devices and circuitry implementing the process) may be initiated, run, and/or controlled by widget 105 or OPP 113 of FIG. 1, or a combination thereof.

At step 1702, a video asset (or portion thereof) may be stored in a first buffer. For example, when a user indicates a desire to view the video asset, a portion of the video frames composing the video asset may be stored in the first buffer. As the video asset is displayed, additional frames may be stored within the first buffer continuously or periodically, e.g., as needed. At step 1704, modified frames may be stored in a second buffer. The modified frames may include any of the original frames of the video asset that were previously modified to embed a media element, e.g., in an object region.

The modified frames may be stored in the second buffer, for example, at the same time the corresponding unmodified frames are stored in the first buffer. Modified frames may be identified and/or located using any suitable technique. For example, modified frames may be linked or otherwise associated with the unmodified frames and/or video asset, e.g., by a data pointer or addressing scheme. As another example, modified frames may have been previously stored near (e.g., adjacent to) or within the same storage location as the unmodified frames. As yet another example, a data record may be retrieved that lists the modified frames for the video asset.

At step 1706, a determination is made (e.g., by widget 105 of FIG. 1) as to whether a frame of the video asset has a corresponding modified frame. This determination may be made, for example, when the frame or video asset is about to be displayed, or at any other suitable time. A modified frame may be identified using the techniques described above (e.g., using a data pointer or data record). In some embodiments, the second buffer may only store a modified frame when one exists and when the corresponding original frame is about to be displayed, otherwise the buffer may be empty. In this embodiment, the determination of step 1706 may be made simply by detecting whether a frame is stored in the second buffer.

At step 1708, it is determined whether a modified frame was identified in step 1706. If not, the process proceeds with step 1710, and the frame to be displayed is retrieved from the first buffer (e.g., data is read from the first buffer, which contains the original frames of the video asset). Otherwise, the process proceeds with step 1712, and the frame to be displayed is retrieved from the second buffer (e.g., data is read from the second buffer, which contains the modified frames). At step 1714, if the video asset has not been completely displayed (and has not been interrupted), the process returns to step 1706 for the next frame to be displayed.

Figure 18:
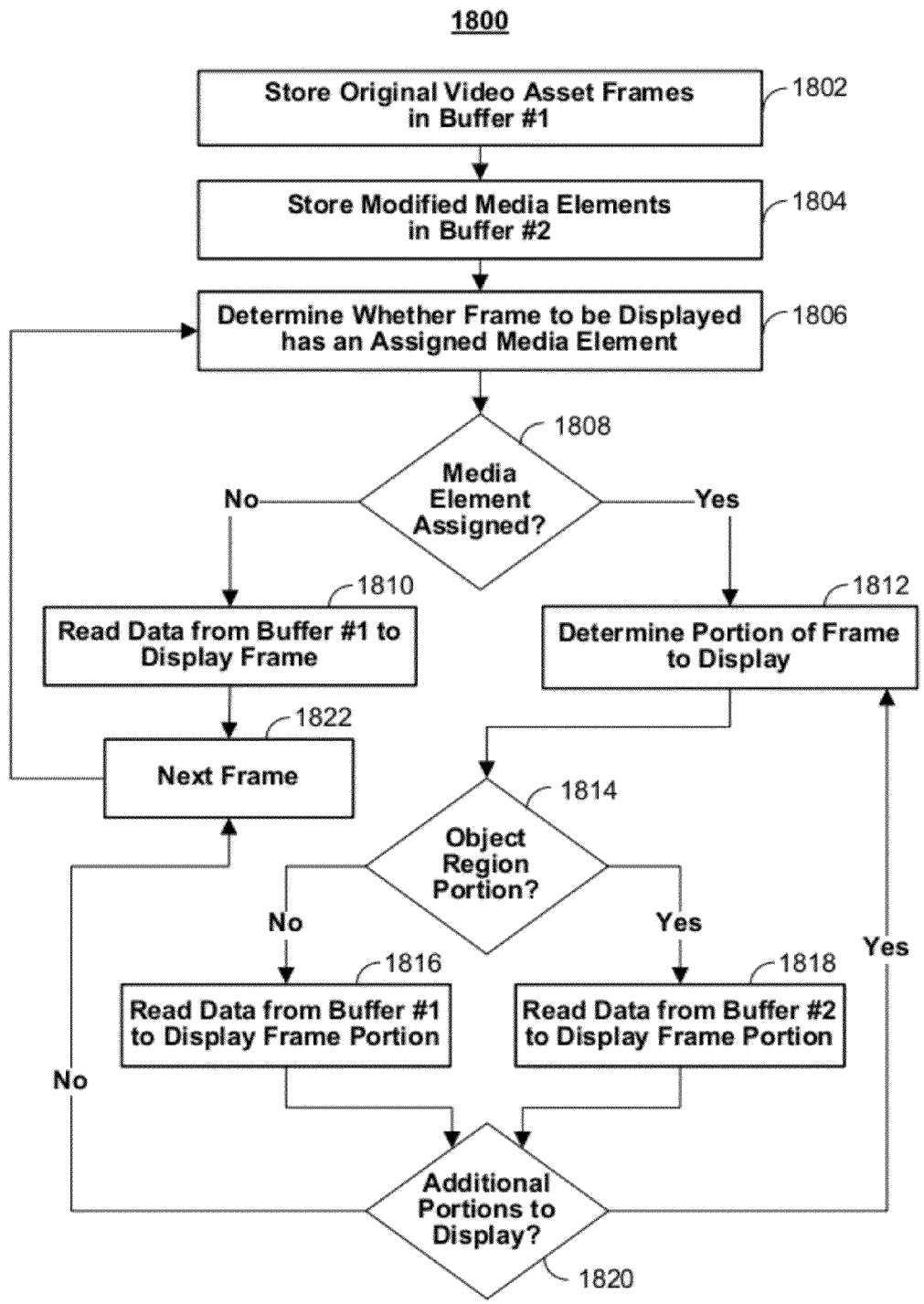
FIG. 18 illustrates a flow chart of an exemplary process for displaying a modified media element within an object region of a video frame in accordance with some embodiments of the present invention.

FIG. 18 shows an illustrative flow chart 1800 depicting an exemplary process for displaying a modified media element within an object region of a video frame in accordance with some embodiments of the present invention. The process described by flow chart 1800 may be implemented, for example, using the devices and circuitry depicted in FIG. 7, including buffer 710, buffer 720, switching circuitry 730, display driver 740, and/or display 750. In some embodiments, the process described by flow chart 1800 (and/or the devices and circuitry implementing the process) may be initiated, run, and/or controlled by widget 105 or OPP 113 of FIG. 1, or a combination thereof.

At step 1802, a video asset (or portion thereof) may be stored in a first buffer. For example, when a user indicates a desire to view the video asset, a portion of the video frames composing the video asset may be stored in the first buffer. As the video asset is displayed, additional frames may be stored within the first buffer continuously or periodically, e.g., as needed. At step 1804, modified media elements may be stored in a second buffer. The modified media elements may have been received from a remote server, and may be suitable for insertion into object regions of one or more frames of the video asset (e.g., stored in the first buffer).

The modified media elements may be stored in the second buffer, for example, at the same time their corresponding target frames are stored in the first buffer. Modified media elements may be identified and/or located using any suitable technique. For example, modified media elements may be linked or otherwise associated with the target object regions, target frames, and/or video asset, e.g., by a data pointer or addressing scheme. As another example, modified media elements may have been previously stored near (e.g., adjacent to) or within the same storage location as the target frames. As yet another example, a data record may be retrieved that lists the modified media elements for the video asset and/or associates the modified media elements with particular frames and/or object regions.

At step 1806, a determination is made (e.g., by widget 105 of FIG. 1) as to whether a frame of the video asset has an assigned modified media element. This determination may be made, for example, when the frame or video asset is about to be displayed, or at any other suitable time. A modified media element may be identified using the techniques described above (e.g., using a data pointer or data record). In some embodiments, the second buffer may only store a modified media element when one exists and when a frame with the target object region is about to be displayed, otherwise the buffer may be empty. In this embodiment, the determination of step 1806 may be made simply by detecting whether a modified media element is stored in the second buffer. In other embodiments, the determination of step 1806 is performed by detecting whether the frame to be displayed is associated with an object region.

At step 1808, it is determined whether a modified media element was identified in step 1806. If not, the process proceeds with step 1810, and the frame to be displayed is retrieved from the first buffer (e.g., data is read from the first buffer, which contains the frames of the video asset). Otherwise, the process proceeds with step 1812, where the portion of the frame to be displayed at the given moment is identified. For example, the portion of frame corresponding to the current location of the scan line (e.g., controlled by the display driver to present an image on the display) is determined. At step 1814, it is determined whether the current portion of the frame being displayed is an area corresponding to the object region of the frame. If not, the image data to be displayed is read form the first buffer at step 1816 (e.g., the frame image data). Otherwise, the image data to be displayed is read from the second buffer at step 1818 (e.g., the modified media element image data).

At step 1820, it is determined if the entire frame area has been displayed (e.g., the scan line has moved to the end position of the display). If not, the process returns to step 1812 and determines the next portion to be displayed. Otherwise, or after step 1810, the process continues to step 1822, where it is determined if other frames in the video asset are timed for display. If so, the process returns to step 1806 and identifies whether the next frame is assigned a modified media element.

Figure 19:
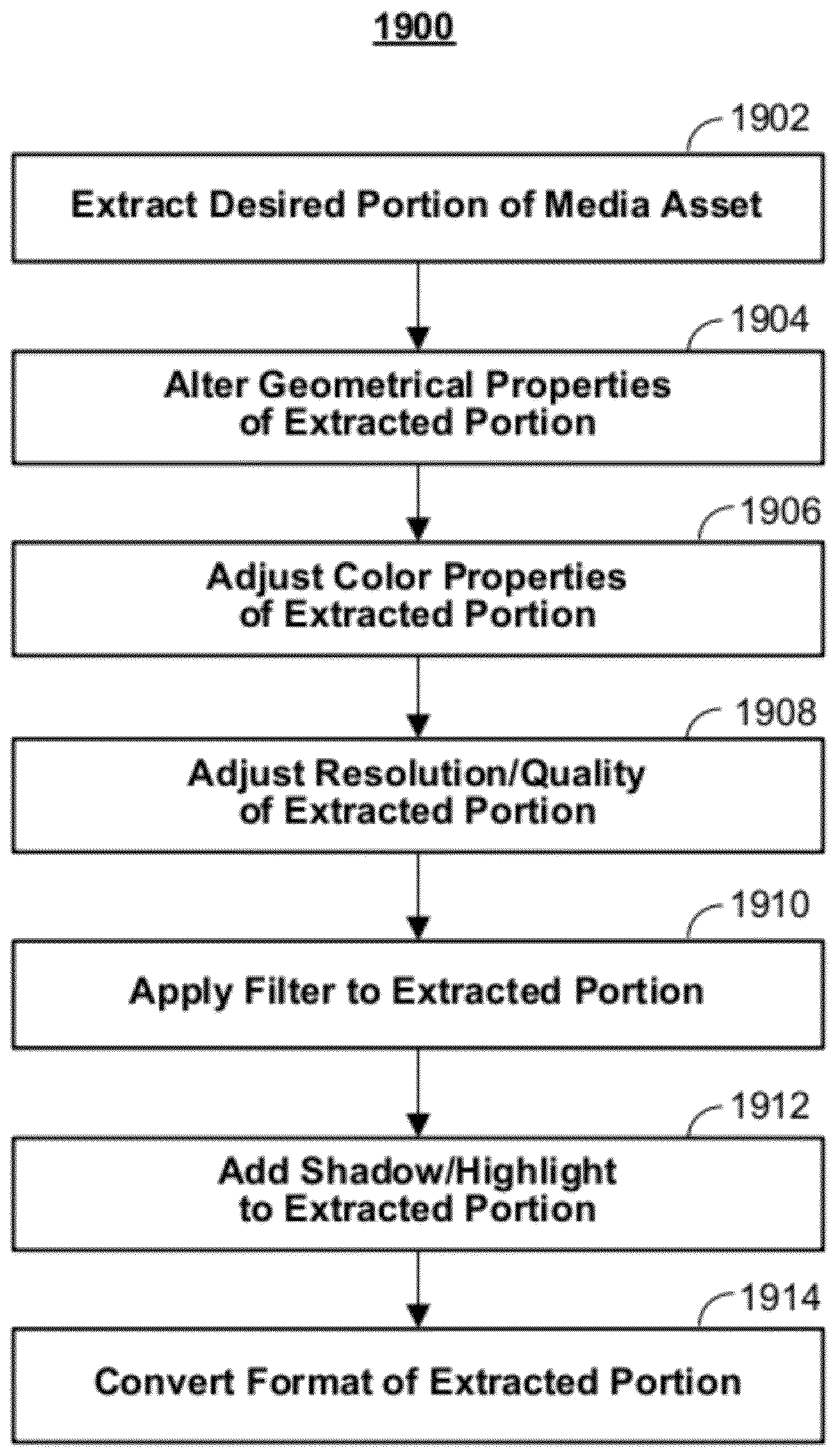
FIG. 19 illustrates a flow chart of an exemplary process for modifying a media element in accordance with some embodiments of the present invention.

Referring now to FIG. 19, illustrative flow chart 1900 is shown depicting an exemplary process for modifying a media element in accordance with some embodiments of the present invention. The processing may be performed at local user equipment (e.g., by widget 105 of FIG. 1) or at a remote location (e.g., media processing server 118 of FIG. 1). Moreover, as discussed above, the processing may be guided by any suitable data, e.g., personalization parameters.

At step 1902, a desired portion of the media element may be extracted. For example, using facial recognition techniques, a face or head of a subject depicted in the media element may be identified and extracted. The media element may also be cropped, e.g., to remove unwanted portions of the media element. For example, the boundaries of a subject depicted in the media element may be detected, and all other portions of the media element may be removed. In some embodiments, the media element may be processed to make certain colors in the media element transparent. It should be understood that a media element may be processed using any suitable techniques and/or algorithms (e.g., via image processing) to remove undesired portions of the media element and/or to extract only desired portions of the media element.

At step 1904, geometrical properties of the media element (or extracted portion thereof) may be altered. Altering geometrical properties may include altering the size of the media element, altering the shape of the media element, altering the orientation of the media element, altering a perspective view of the media element, and/or altering the dimensionality of the media element. For example, a media element may be flipped along its horizontal or vertical axis.

At step 1906, color properties of the media element (or extracted portion thereof) may be adjusted. Adjusting color properties may include adjusting the brightness of the media element, adjusting the contrast of the media element, adjusting the hue and/or saturation of the media element, adjusting the chrominance of the media element, and/or adjusting the luminance of the media element. Adjusting color properties may also include modifying a histogram of the media element and/or modifying the color palette of the media element. For example, the media element may be decolorized into a grayscale version. As another example, the media element may be brightened and/or darkened. The media element may be processed such that the colors of the media element substantially match the colors used in the area of the frame, the frame, and/or the video asset in which the media asset is to be embedded.

At step 1908, the resolution and/or quality of the media element (or extracted portion thereof) may be adjusted. Adjusting resolution/quality may include reducing the number of pixels in the media element (e.g., from 300 dpi to 72 dpi). Adjusting resolution/quality may also include compressing the media element. For example, the number of colors used in the image may be reduced and/or some of the colors in the image may be replaced by colors in a predefined reduced color palette. Adjusting resolution/quality may also include converting the media element from or to high-definition.

A step 1910, a filter may be applied to the media element (or extracted portion thereof). Filters may manipulate the media element in any suitable fashion using any suitable technique (e.g., an image processing algorithm). For example, filters may blur or sharpen the edges of the media element. As another example, filters may introduce artifacts into the media element (e.g., a motion blur, a light source, etc.). Additional artifacts may be added to the media element in step 1912, namely, a drop shadow or highlight.

At step 1914, the media element (or extracted portion thereof) may be converting from a first format to a second format. For example, the media element may be converted from JPEG format to a Device Independent Bitmap format. As another example, the media element may be converted to any of the PNG, TIFF, and GIF formats. The media element may be converted several times and/or converted to any format suitable for display, e.g., on user equipment.

Processing a media element may additionally include enlarging the media element, e.g., by adding new pixels to the image. Each of the new pixels may be generated, in some embodiments, based on an average of two or more original pixels surrounding or neighboring the new pixel. The enlarged media element may then be mapped onto a predefined shape (e.g., as defined by data associated with the object region). One technique, for instance, for mapping a media element onto a new shape may include nearest neighbor processing and/or bilinear filtering. Moreover, processing a media element may include texture mapping, color-remapping, semitransparent computations, and opaque overlaying.

Figure 20:
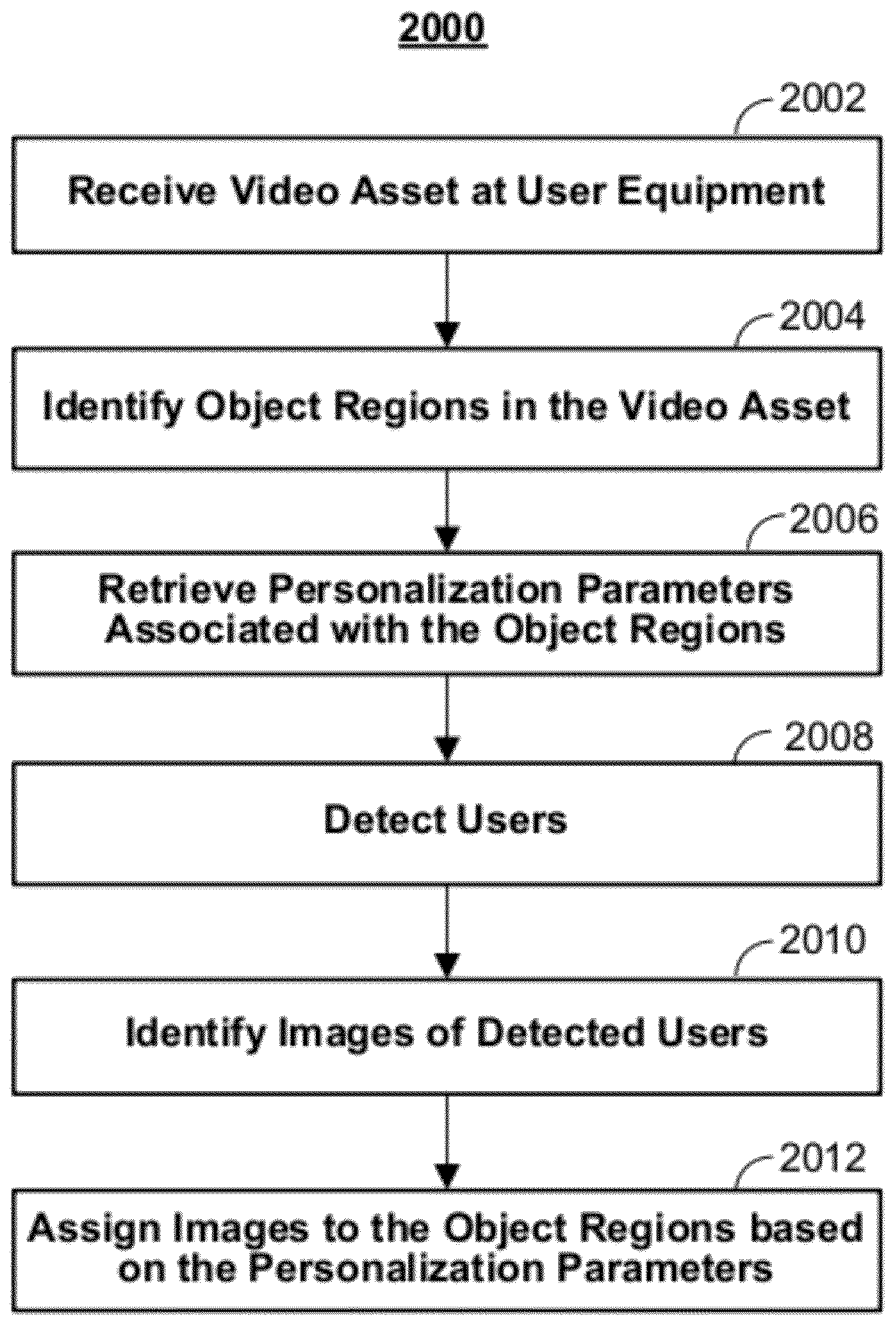
FIG. 20 illustrates a flow chart of an exemplary process for detecting users and assigning images of the users to various object regions of video frames in accordance with some embodiments of the present invention.

FIG. 20 shows illustrative flow chart 2000 depicting an exemplary process for detecting users and assigning images of the users to various object regions of video frames in accordance with some embodiments of the present invention. At step 2002, a video asset may be received at user equipment, e.g., in response to an indication from a user. At step 2004, object regions associated with frames in the video asset are identified (e.g., using any of the above-described methods of identifying object regions). At step 2006, personalization parameters associated with the identified object region may be retrieved (e.g., using any of the above-described methods of retrieving personalization parameters).

At step 2008, users may be detected, e.g., based on the personalization parameters. For example, based on the unique identifiers (described above) of the identified object regions, a number of desired users may be determined. The process may then attempt to detect the desired number of users. User detection may involve identifying the user that requested the video asset, e.g., from user information (e.g., extracted from user profile information). In some embodiments, the physical presence of users may be detected, e.g., as described in connection with user detection circuitry 207 of FIG. 2. In other embodiments, users associated with the requesting user may be detected or identified. For example, users connected to the requesting user on a social networking web site (e.g., users labeled as friends and/or family) may be identified. As another example, users with the same demographic data as the requesting user may be identified, e.g., from service provider 102 if FIG. 1. In some embodiments, multiple users may have indicated a desire to watch the video asset and may be grouped.

At step 2010, images of the detected users may be located. As described above, images may be located on user equipment (or each user's user equipment in the case of multiple users). Alternatively, images may be located on a third party server, e.g., in a database maintained by a social networking service. In another alternative approach, as discussed in connection with FIG. 2, a camera or other optical device may capture images of the detected users. In yet another alternative approach, users may provide their own images, e.g., by indicating an image location on a storage device.

At step 2012, the images may be assigned to object regions, e.g., based on the personalization parameters. In some embodiments, images may be assigned to object regions based on their display characteristics. For example, an image with a given shape may be selected for an object region with the closest matching shape. In other embodiments, the same image may be selected for object regions with the same unique identifier and/or different images may be selected for object regions with distinct unique identifiers, as discussed above. Images may be assigned so that each object region is assigned at least one image. However, if a suitable image is not located for one or more object regions, default images may be used instead. Default images may be retrieved, for example, from one or more remote databases (e.g., databases 112). Images assigned to object regions may be processed and/or embedded within the corresponding frames according to any of the techniques and features described herein.

Although the description herein describes a media element chiefly in terms of an image, it should be understood that the features and techniques described may be adapted to other types of media elements. For example, a video may be embedded within an object region of a frame by selecting and embedding one of the frames of the video. As another example, text may be embedded within an object region. In some embodiments, non-image media elements may be converted to an image format before being embedded. It should also be understood that media elements may, in some cases, be associated with audio content, and the associated audio content may be played when the media element is displayed, e.g., as part of a modified frame.

In addition, although the description herein describes personalizing video content or a video asset, it should be understood that such content may alternatively be image content, textual content, audio content, or multimedia content. For example, the content may be an advertisement, or content displayed on an e-reader device (e.g., a digital publication). The content may also be interactive (e.g., video game content).

It will be apparent to those of ordinary skill in the art that methods involved in the present invention may be embodied in a computer program product that includes a non-transitory computer usable and/or readable medium. For example, such a non-transitory computer readable medium may consist of a read-only memory device, such as a CD-ROM disk or conventional ROM devices, or a random access memory, such as a hard drive device or a computer diskette, having a computer readable program code stored thereon.

In various embodiments, in addition to the foregoing embodiments, user equipment or remote server equipment may receive a video asset that includes one or more default media elements assigned to, or embedded within, one or more object regions of a video frame. The default media elements may be displayed when personalization fails or otherwise results in an undesirable modified frame, or upon a user request (e.g., a user indication to access a "non-personalized" mode). The aforementioned user request may be received at any time, including during video display, thereby allowing the user to switch between a "personalized mode" and a "non-personalized" mode at the user's discretion.

In other embodiments, a number of media elements (or modified media elements) may be assigned to the same object region of a video frame, or a number of modified frames embedding different media elements may each be associated with (and/or derived from) the same corresponding unmodified frame. The particular media element or modified frame selected for display to a user may depend, in these embodiments, on user information, user indications, or any other suitable criteria. For example, a first media element or a first modified frame (e.g., randomly selected from the available set of media elements or modified frames, or selected based on a suitable selection algorithm) may be displayed to a user. The user may then indicate (e.g., using user input interface 210 of FIG. 2) that a different media element or modified frame should be displayed. In response to the user indication, a second media element or a second modified frame is accordingly displayed. A user may thus "browse" through some or all available media elements or modified frames, e.g., in sequence. As another example, a video asset may be associated with different sets of media elements or modified frames, grouped into "personalization themes." Each personalization theme may correspond, for instance, to a different user, and each media element or modified frame in a given personalization theme may contain image content related to the given user. Accordingly, a user may browse through and/or select personalization themes, and the resulting video will contain media elements consistent with the selected theme. The theme may be changed at any time, including during video display, e.g., at the user's discretion.

In various embodiments, an object region may be associated with a video asset and/or frame (or groups of frames) in any suitable manner. In one approach, the object region is a video artifact (e.g., a chroma key) and is associated with a video frame by virtue of its presence within the frame. In another approach, the object region is defined by a set of coordinates or other suitable location data and associated with a video frame, for example, in a data record of a database or as metadata. Object region location data may also be associated generally with the video asset and mapped to the relevant frame via a frame ID, a frame number, or a time (e.g., the duration into the video asset at which point the relevant frame appears), or any other suitable frame mapping. In some embodiments, the media element to be incorporated into a frame is a video element that itself includes a number of frames. These video element frames may be incorporated into frames of the video asset, e.g., by incorporating one video element frame into each of a number of consecutive frames of the video asset (e.g., in a one-to-one pairing). In other embodiments a media element may include audio (or may be audio), and incorporating the media element into a video frame may include playing the audio and/or mixing the audio with the audio of the video asset.

In various embodiments, an object region of a video frame may be obscured by, or overlaid with, part of the video frame. For example, a foreground object may obscure or overlay a section of the object region. In these embodiments, in one approach, the object region may be modified such that the object region no longer includes the area obscured or overlaid. In a second approach, the media element displayed within the object region may be edited to remove those parts of the media element that overlap the areas obscured or overlaid by video frame content. In a third approach, those portions of the video frame that obscure or overlap the object region may be overlaid on top of the media element displayed within the object region. For example, the media element may be displayed beneath the object region, and the object region may be made transparent.

In various embodiments, a media element may be processed (either at user equipment, remotely, or a combination thereof) and the processed media element may be incorporated into multiple object regions. In some cases, the media element may undergo various levels of processing depending on the requirements of the object region. For example, a media element may be enlarged, and the enlarged media element may be subsequently rotated for insertion into one object region but brightened for insertion into another object region. In this scheme, the media element may only undergo enlargement once, thus saving valuable processing resources.

In various embodiments, processing and/or display resources within user equipment may be identified, and a quality setting may be automatically selected based on the available resources or based on user information. A media element may then be processed, at the user equipment or at a remote server, to reduce or enhance the media element to a quality determined by the selected quality setting. For example, a lower quality may be selected when the user is determined to be a casual viewer, child, or sight-impaired.

In other embodiments, a length of time required for modifying and/or embedding a media element (i.e., within an object region of a video frame) may be determined. The modification and/or embedding process may then be initiated at least the determined length of time before the modified media element is timed for display.

In addition to the foregoing, the features described herein enable and include systems and methods for generating personalized video content with a user selected media element. In particular, a user may upload or otherwise transmit a media element to a remote server, where the media element may be processed and/or embedded into one or more video frames of a video asset. The video asset may also be indicated by the user, e.g., via a selection screen of a web site, or it may be chosen by the remote server. The video asset, including the modified frames may then be broadcast, downloaded, or otherwise transmitted to the user. The video asset, including the modified frames may also be broadcast, downloaded, or otherwise transmitted to other users, e.g., determined to be associated with the user based on demographic data, regional data, social networking connections, etc.

In various embodiments, the a video asset may be broadcast (or multicast) to multiple users and stored on user equipment. Each copy of the video asset may then undergo personalization, as described above, in accordance with the user information and/or user selections associated with the particular recipient of the given copy. Accordingly, a robust scheme for personalizing video assets on an individual level is provided. This scheme is advantageous at least because valuable bandwidth and processing resources are conserved, thus allowing the systems and methods herein to support a large number of users. For example, a video asset may be broadcast to each user only once. Subsequently, only media elements and/or individual frames are passed between user equipment and one or more remote servers for processing and/or embedding, as necessary. There is no need to rebroadcast or transmit the entire video asset or frames which remain unmodified.

In some embodiments, the remote server (or head end) may locate and/or identify various media elements (e.g., images) to incorporate into a video asset, based on, for example, a target group of users. For example, images of users located in the same regional area (e.g., dormitory, town, etc.) may be incorporated into a video asset, and the personalized video asset may be broadcast or transmitted to those users or to all users in that regional area. As another example, images of users with certain demographic characteristics (e.g., age) may be incorporated into a video asset, and the personalized video asset may be broadcast or transmitted during a time when users of the given demographic typically view programming.

In various embodiments, a video asset may be designed with significant time periods between frames and/or scenes containing frames with object regions for personalization. During these time periods, user equipment may queue the buffers required for personalizing the next video frame. After each personalized frame or scene, user equipment may use the time interval until another personalized frame is due to be displayed to fill the buffers with the necessary media elements and/or modified frames. Furthermore, in some embodiments, the video asset may be analyzed to determine the amount of time and number of buffers, or other processing resources, required to personalize a frame before it is displayed. The user equipment may allocate buffers and/or other processing resources based on the determination. This determination may further be made before the video asset is displayed or in real-time.

As discussed above, in some embodiments, a remote server processes a media element and produces a modified media element and/or a modified frame embedding the (modified or unmodified) media element. For example, the remote server may compute and render rectangular sections of images for each and every field of the video asset with an object region. After processing, the remote server may transmit the modified media elements or frames to user equipment with data specifying exactly where and/or when to display the modified media elements or frames within the video asset. The remote server may transmit the modified media elements or frames and the location and/or timing data all at once or just before it is needed. Alternatively, the user equipment may request and/or retrieve the modified media elements or frames and data when desirable (e.g., in time for processing and display).

In some embodiments, widget 105 of FIG. 1 may be able to detect when a media element does not require processing or requires minimum processing, e.g., the object region of the frame to be personalized is a rectangle facing the screen head-on. In this case, the media element may not be sent to a remote server for processing, but displayed immediately without processing or with minimal local processing. It should be understood that widget 105 may be able to detect the processing required to display a media element in a modified frame, and may determine when to transmit the media element remotely for processing based on the processing requirements, e.g., when local hardware and/or software is not sufficient to perform the required processing.

In some embodiments, all media element processing is performed remotely and the function of widget 105 of FIG. 1 is limited to displaying modified media elements and/or modified video frames at the proper location and/or time within the personalized video asset. Widget 105 may accomplish this function using frame and/or field synchronization techniques. Synchronization data may accordingly be provided with the video asset, e.g., in the data section, video section, and/or audio section of the video asset.

In addition to the foregoing, as discussed above in connection with FIG. 1, a set-top box or other processing circuitry in user equipment 108 may decode a video asset (e.g., encoded in a web format) and output the video asset in one or more formats (e.g., a standard television format). In one approach, the set-top box or other processing circuitry may read data, including personalization parameters for the video asset, from the Internet as the video asset is received. The video asset may then be personalized by the set-top box or other processing circuitry using the data read from the Internet. The personalized video asset may then be stored or displayed. The media elements used to personalize the video asset may be included in the data read from the Internet, they may be retrieved from a local data store, and/or they may be retrieved from a remote server. Accordingly, in this embodiment as well as other embodiments described above, the video asset may be broadcast or transmitted to a plurality of users, e.g., simultaneously, and personalized locally at user equipment.

Although the description herein refers primarily to receiving a video asset from a remote server or service provider, the personalization techniques detailed above may also be used to personalize a video asset provided locally to user equipment. For example, the video asset may be a video created by the user on the user equipment or other local device. As another example, the video asset may be stored on DVD and provided by a DVD player, or it may be stored on a local storage device (e.g., previously downloaded Internet video or previously recorded video). As yet another example, the video asset may be real-time streaming video from a local video camera. The video asset, whether retrieved locally or remotely, may be generated with or edited to include object regions, or it may be associated with corresponding data to enable personalization of the video frames.

It is to be understood that while certain forms of the present invention have been illustrated and described herein, it is not to be limited to the specific forms or arrangement of parts described and shown. Those skilled in the art will know or be able to ascertain using no more than routine experimentation, many equivalents to the embodiments and practices described herein. Accordingly, it will be understood that the invention is not to be limited to the embodiments disclosed herein, which are presented for purposes of illustration and not of limitation.

What is claimed is:

1. A method for displaying personalized video content, the method comprising:
   receiving, at user equipment, video content comprising a plurality of frames, wherein the plurality of frames includes a preliminary frame that has an object region;
   identifying, with the user equipment, a media element suitable for display within the object region;
   transmitting the media element to a remote server, wherein the remote server processes the media element to produce a modified version of the media element;
   receiving the modified version of the media element at the user equipment; and
   displaying the video content at the user equipment, wherein a modified frame incorporating the modified version of the media element is displayed in place of the preliminary frame.

2. The method of claim 1 further comprising embedding, at the user equipment, the modified version of the media element within the object region of the preliminary frame to produce the modified frame.

3. The method of claim 1, wherein receiving the modified version of the media element comprises receiving the modified frame from the remote server, wherein the remote server embeds the modified version of the media element within the object region of the preliminary frame to produce the modified frame.

4. The method of claim 3 further comprising transmitting the preliminary frame to the remote server.

5. The method of claim 1 further comprising:
   storing the video content including the preliminary frame within a storage device in response to receiving the video content at the user equipment; and
   storing the modified frame in place of the preliminary frame within the storage device;
   wherein displaying the video content comprises reading the video content including the modified frame from the storage device.

6. The method of claim 1 further comprising:
   storing the video content within a first buffer; and
   storing the modified frame within a second buffer;
   wherein displaying the video content comprises:
      reading the video content from the first buffer when displaying each of the plurality of frames other than the preliminary frame; and
      reading the video content from the second buffer when displaying the modified frame in place of the preliminary frame.

7. The method of claim 1 further comprising:
   storing the video content including the preliminary frame within a first buffer; and
   storing the modified version of the media element within a second buffer;
   wherein displaying the modified frame in place of the preliminary frame comprises:
      reading data associated with the preliminary frame from the first buffer when displaying all portions of the preliminary frame other than the object region; and
      reading data associated with the modified version of the media element from the second buffer when displaying the object region of the preliminary frame.

8. The method of claim 1 further comprising:
   identifying available processing resources within the user equipment; and
   determining that the identified processing resources are insufficient to generate the modified version of the media element;
   wherein transmitting the media element to the remote server comprises transmitting the media element to the remote server in response to the determination.

9. The method of claim 1, wherein identifying the media element suitable for display within the object region comprises identifying the media element based on personalization parameters associated with the object region, and wherein the personalization parameters include at least one of a display property, a content characteristic, and a unique identifier.

10. The method of claim 1, wherein identifying the media element suitable for display within the object region comprises receiving a user indication of the media element.

11. A system for displaying personalized video content, the system comprising:
   a receiver configured to receive video content comprising a plurality of frames, wherein the plurality of frames includes a preliminary frame that has an object region; and
   processing circuitry configured to:
      identify a media element suitable for display within the object region;
      transmit the media element to a remote server, wherein the remote server processes the media element to produce a modified version of the media element; and
      receive the modified version of the media element; and
      display the video content, wherein a modified frame incorporating the modified version of the media element is displayed in place of the preliminary frame.

12. The system of claim 11, wherein the processing circuitry is further configured to embed the modified version of the media element within the object region of the preliminary frame to produce the modified frame.

13. The system of claim 11, wherein the processing circuitry is further configured to receive the modified frame from the remote server, wherein the remote server embeds the modified version of the media element within the object region of the preliminary frame to produce the modified frame.

14. The system of claim 13, wherein the processing circuitry is further configured to transmit the preliminary frame to the remote server.

15. The system of claim 11, wherein the processing circuitry is further configured to:

store the video content including the preliminary frame within a storage device in response to receiving the video content;

store the modified frame in place of the preliminary frame within the storage device; and read the video content including the modified frame from the storage device when displaying the video content.

16. The system of claim 11, wherein the processing circuitry is further configured to:

store the video content within a first buffer;

store the modified frame within a second buffer;

read the video content from the first buffer when displaying each of the plurality of frames other than the preliminary frame; and read the video content from the second buffer when displaying the modified frame in place of the preliminary frame.

17. The system of claim 11, wherein the processing circuitry is further configured to:

store the video content including the preliminary frame within a first buffer;

store the modified version of the media element within a second buffer;

read data associated with the preliminary frame from the first buffer when displaying all portions of the preliminary frame other than the object region; and read data associated with the modified version of the media element from the second buffer when displaying the object region of the preliminary frame.

18. The system of claim 11, wherein the processing circuitry is further configured to:

identify available processing resources within the user equipment; and determine that the identified processing resources are insufficient to generate the modified version of the media element;

wherein the processing circuitry transmits the media element to the remote server in response to the determination.

19. The system of claim 11, wherein the processing circuitry is further configured to identify the media element based on personalization parameters associated with the object region, and wherein the personalization parameters include at least one of a display property, a content characteristic, and a unique identifier.

20. The system of claim 11, wherein the processing circuitry is further configured to receive a user indication of the media element, and wherein the processing circuitry identifies the media element based on the user indication.

* * * * *